United States Patent [19]
Jones et al.

[11] Patent Number: 5,996,741
[45] Date of Patent: Dec. 7, 1999

[54] PIN-IN-TRACK LIFT SYSTEM

[75] Inventors: David P. Jones, Bellvue, Colo.; Mark A. Smith, Holdrege, Nebr.

[73] Assignee: Hewlett-Packard Company, Palo Alto, Calif.

[21] Appl. No.: 09/031,753

[22] Filed: Feb. 27, 1998

Related U.S. Application Data

[60] Provisional application No. 60/072,621, Jan. 26, 1998.

[51] Int. Cl.⁶ ...................................................... B66B 9/02
[52] U.S. Cl. ....................... 187/250; 414/280; 360/96.5; 360/99.06; 360/92; 369/72.2; 74/110; 74/129
[58] Field of Search ........................... 187/250; 414/280; 360/96.5, 99.06, 92, 98.04, 98.05, 98.06; 369/72.2, 34; 74/110, 129

[56]                References Cited

U.S. PATENT DOCUMENTS

| | | |
|---|---|---|
| 4,684,021 | 8/1987 | Niebling et al. .................... 414/940 X |
| 4,837,647 | 6/1989 | Nonaka et al. . |
| 5,001,582 | 3/1991 | Numasaki . |
| 5,036,503 | 7/1991 | Tomita . |
| 5,060,211 | 10/1991 | Blanding . |
| 5,084,854 | 1/1992 | Ikedo et al. ........................ 369/77.1 X |
| 5,101,387 | 3/1992 | Wanger et al. . |
| 5,164,929 | 11/1992 | Kurosawa et al. ..................... 369/34 X |
| 5,544,146 | 8/1996 | Luffel et al. . |
| 5,544,147 | 8/1996 | Koizumi et al. ....................... 369/34 X |
| 5,596,556 | 1/1997 | Luffel et al. . |
| 5,607,276 | 3/1997 | Muka et al. ......................... 414/940 X |
| 5,629,817 | 5/1997 | Shiomi ................................... 360/85 X |
| 5,684,777 | 11/1997 | Fukuyama et al. ..................... 369/77.2 |
| 5,706,147 | 1/1998 | Lee ......................................... 360/96.5 |
| 5,719,833 | 2/1998 | Jones ..................................... 360/92 X |
| 5,726,828 | 3/1998 | Kakuta et al. ................... 360/98.04 X |
| 5,834,915 | 11/1998 | Babbs et al. ........................ 414/940 X |
| 5,859,827 | 1/1999 | Osada ............................... 360/99.06 X |

FOREIGN PATENT DOCUMENTS

WO85/02051   5/1985   WIPO .

OTHER PUBLICATIONS

Hewlett–Packard Journal dated Dec. 1994, vol. 45, No. 6, pp. 2–20.

Primary Examiner—Christopher P. Ellis
Assistant Examiner—Steven B. McAllister

[57]    ABSTRACT

A lift system for raising and lowering a carriage may comprise a pin-in-track position indexing apparatus having a position indexing track with first and second inclined branches and at least one guide pin for engaging the position indexing track. The guide pin may be attached to the carriage. Switching apparatus associated with the pin-in-track position indexing apparatus allows the guide pin to follow the first and second inclined branches of the position indexing track. An actuator operatively associated with the pin-in-track position indexing apparatus actuates the pin-in-track position indexing apparatus to raise and lower the carriage.

33 Claims, 15 Drawing Sheets

PIN-IN-TRACK LIFT SYSTEM

REFERENCE TO CO-PENDING PROVISIONAL APPLICATION

Applicants hereby claim the benefit of an earlier filed co-pending provisional application, application Ser. No. 60/072,621, filed on Jan. 26, 1998.

FIELD OF INVENTION

This invention relates generally to systems for handling and storing data cartridges, such as optical disk or magnetic tape cartridges, and more specifically to positioning systems for moving cartridge access devices along arrays of data cartridges.

BACKGROUND

Many different types of data storage and handling systems exist and are being used to store data cartridges at known locations and to retrieve a desired cartridge so that data may be written to or read from the data cartridge. Such data storage and handling systems are often referred to as "juke box" data storage systems, particulary if they can accommodate a large number of individual data cartridges.

While the data cartridges may be arranged within the data storage system in any of a wide variety of configurations, many juke box data storage systems are designed so that the data cartridges are stored in one or more vertical stacks or arrays. If so, the data storage system is usually provided with positioning apparatus for moving a cartridge access device up and down the array of cartridges so that the cartridge access device can access selected data cartridges stored in the array. Depending on the particular system, the cartridge access device may comprise a cartridge engaging assembly or "picker" which may be adapted to engage the selected data cartridge, withdraw it from the array, and carry it to a cartridge read/write device located elsewhere within the system. The read/write device may then be used to read data from or write data to the cartridge. Once the read/write operation is complete, the cartridge engaging assembly or picker may withdraw the data cartridge from the read/write device and return it to the appropriate storage location. In another type of system, the cartridge access device may comprise the read/write device itself, in which case data cartridge may be read from or written to without the need to carry the data cartridge to a separate read/write device.

Regardless of the particular type of cartridge access device that is utilized by the data storage system, the positioning system must be capable of moving the cartridge access device along the cartridges stored in the array so that the desired cartridge may be accessed. One type of positioning system, often referred to as a "lead-screw" system, mounts the cartridge access device on a lead-screw, which when turned, moves the cartridge access device up and down along the array of cartridges. While such lead-screw positioning systems are being used, they are not without their problems. For example, in such a system the cartridge access device is often cantilevered on the lead-screw. Such a cantilevered mounting arrangement tends to allow excessive transverse or rotational movement of the cartridge access device which reduces positional accuracy and may make it difficult for the cartridge access device to engage the desired data cartridge.

Partly in an effort to solve the foregoing problems, positioning systems have been developed which utilize separate guide rails or tracks to guide the cartridge access device across the array of cartridges. The cartridge access device is mounted to the separate guide rails or tracks and the lead-screw is then used only to move the cartridge access device to the desired location. While such systems generally provide for increased positional accuracy over the cantilevered type of lead-screw positioning systems, they are still not without their disadvantages. For example, the guide rail or track assemblies are usually precision machined components, which adds to the overall cost of the data storage system. Moreover, the guide rail or track assemblies are often difficult to align and may become mis-aligned during subsequent shipping or movement of the cartridge handling device. If the mis-alignment is substantial, it may be necessary to re-align and re-calibrate the positioning system before the data storage system can be placed in operation.

Consequently, a need remains for a positioning system for moving a cartridge access device across an array of cartridges that provides increased positional accuracy to reduce errors due to misalignment of the cartridge access device. Such increased positional accuracy should be achieved with a minimum number of components to maximize reliability, yet not require the use of expensive, precision machined components and guide rails. Additional advantages could be realized by reducing the amount of time required to align and calibrate the assembly during production and by reducing the likelihood of subsequent mis-alignment, such as may occur during shipping or from rough handling. Ideally, the positioning system should be made as small as possible so that it may be mounted in a relatively small space within the data storage system.

SUMMARY OF THE INVENTION

A lift system for raising and lowering a cartridge access device may comprise a pin-in-track position indexing apparatus having a position indexing track with first and second inclined branches and at least one guide pin for engaging the position indexing track. The guide pin may be attached to the carriage. Switching apparatus associated with the pin-in-track position indexing apparatus allows the guide pin to follow the first and second inclined branches of the position indexing track. An actuator operatively associated with the pin-in-track position indexing apparatus actuates the pin-in-track position indexing apparatus to raise and lower the carriage.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
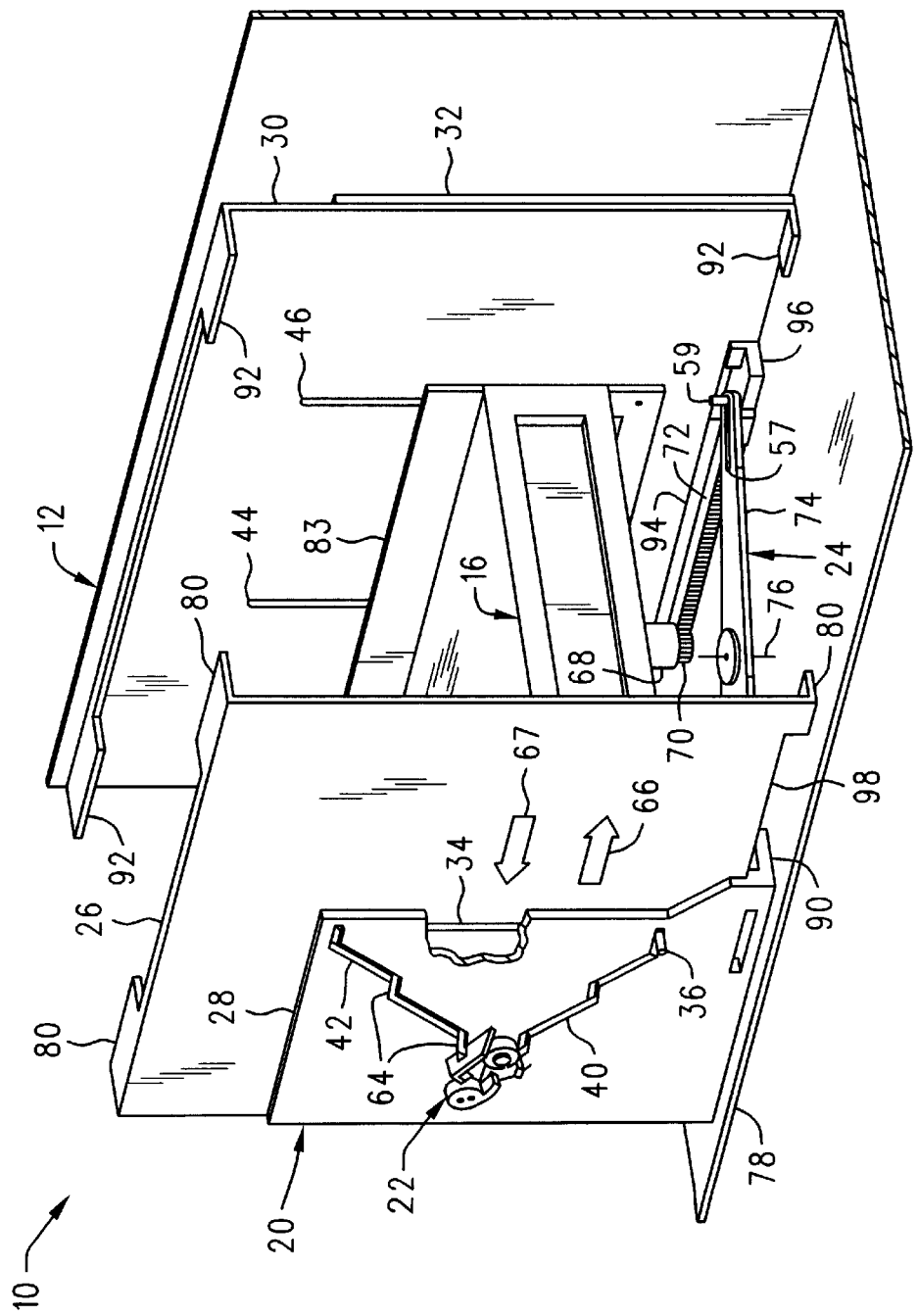
FIG. 1 is a perspective view of a lift system according to the present invention as it could be used in a juke box data storage system to raise and lower a media access device.
Figure 2:
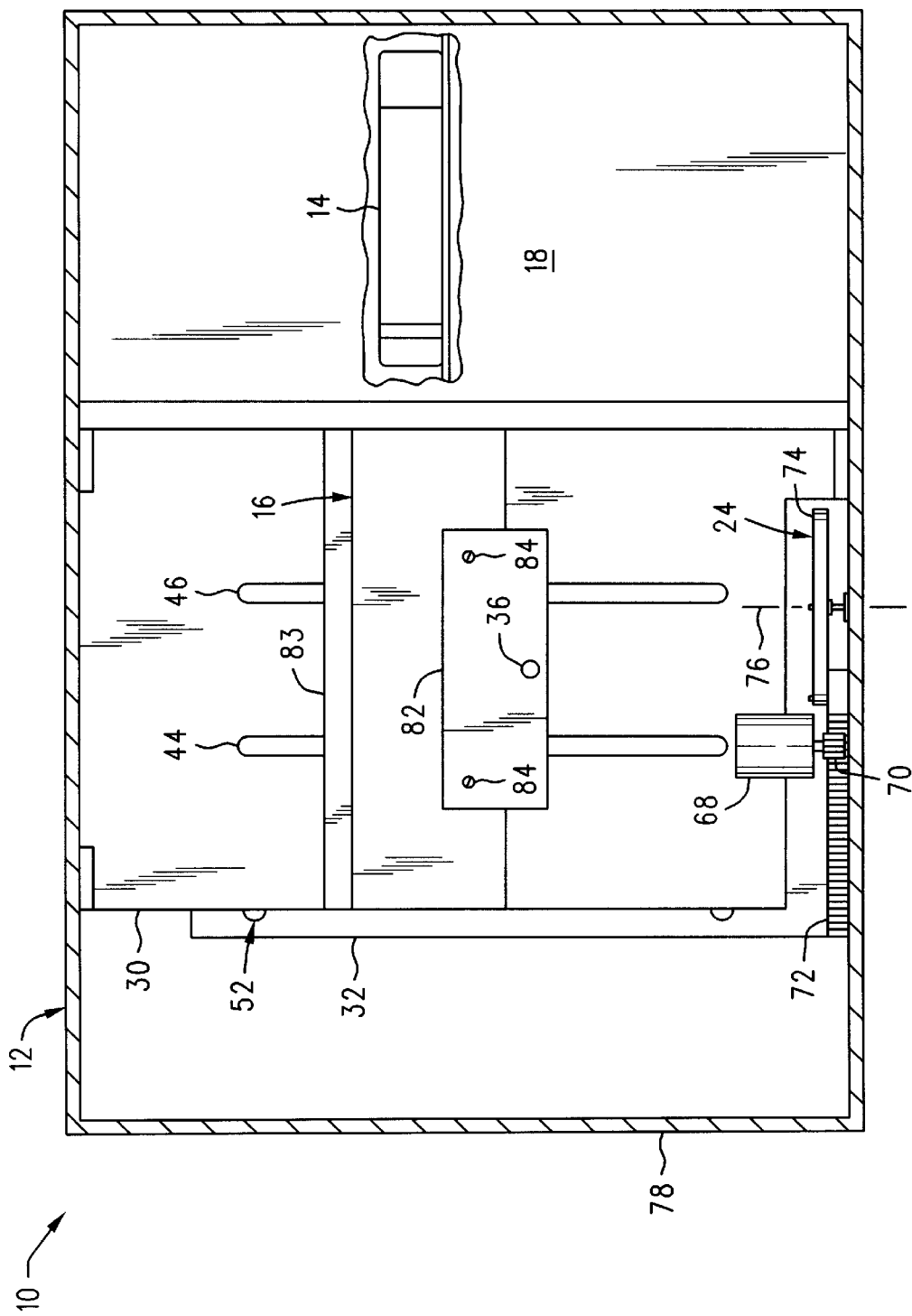
FIG. 2 is a left side view in elevation of the juke box data storage system shown in FIG. 1 with the left side sliding and fixed plates removed to more clearly show the sliding plate actuator system.
Figure 3:
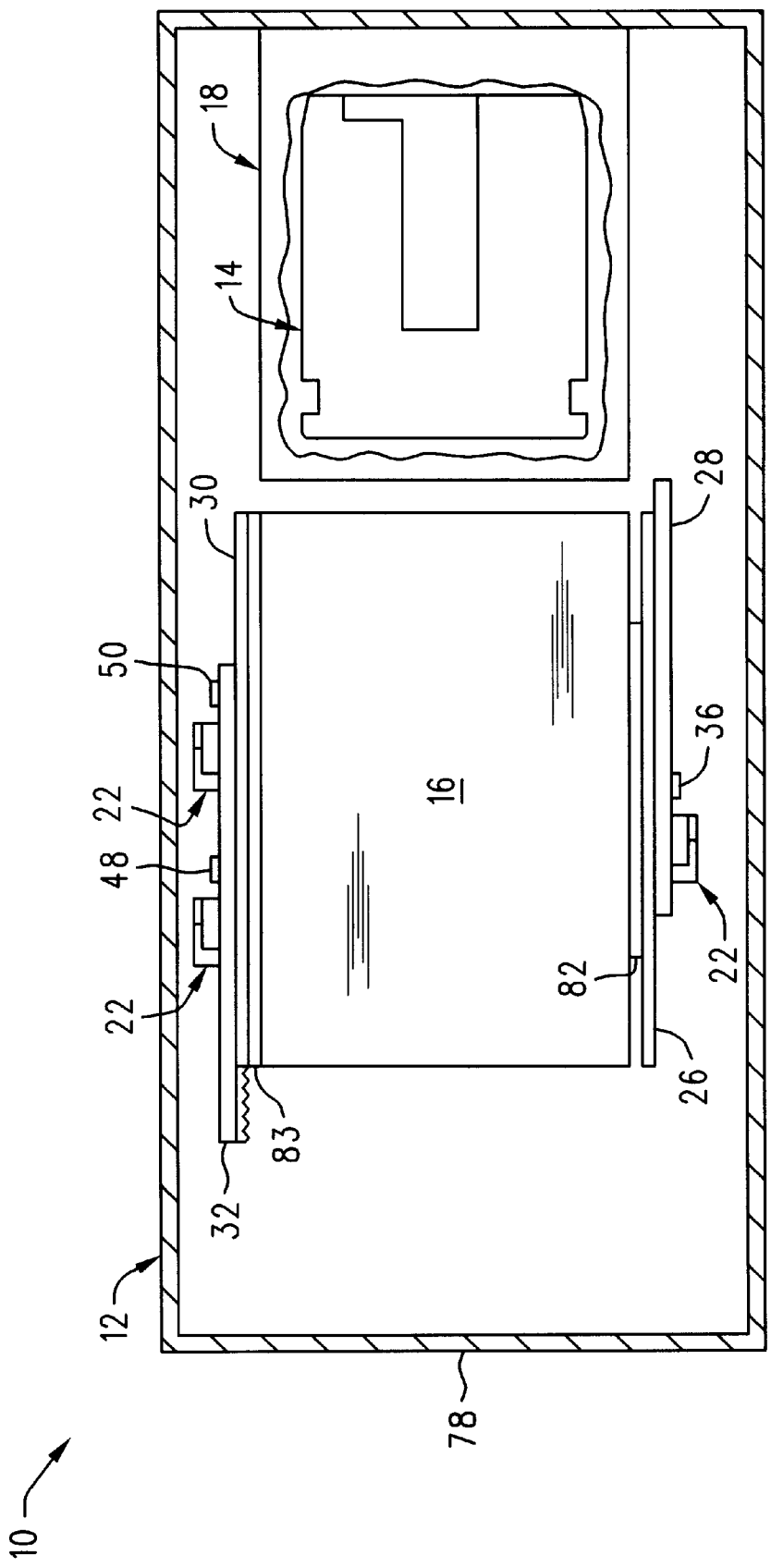
FIG. 3 is a plan view of the juke box data storage system.

A lift system 10 is shown in FIGS. 1–3 as it could be used in a juke box data storage system 12 of the type used for storing and accessing data recorded on one or more data cartridges 14 (not shown in FIG. 1 but shown in FIGS. 2 and 3). Specifically, the lift system 10 is used to raise and lower a media access device 16 so that the same may access a selected data cartridge 14 positioned in a cartridge storage array 18. See FIGS. 2 and 3.

The lift system 10 may comprise a pin-in-track position indexing apparatus 20, at least one switching device 22, and an actuator system 24, as best seen in FIG. 1. In one preferred embodiment, the pin-in-track position indexing apparatus 20 comprises a left side fixed plate 26, a left side sliding plate 28, a right side fixed plate 30, and a right side sliding plate 32. The left side fixed plate includes an elongate slot 34 sized to receive a left side pin 36 which is attached to the media access device 16. The left side sliding plate 28 includes a position indexing track 38 having a first or lower inclined branch section 40 and a second or upper inclined branch section 42, both of which are also sized to slidably receive the left side pin 36. The switching device 22 is located at about the intersection of the first and second inclined branch sections 40 and 42 of position indexing track 38 and directs the left side pin 36 between the first and second inclined branch sections 40 and 42 in the manner that will be described below.

Figure 5:
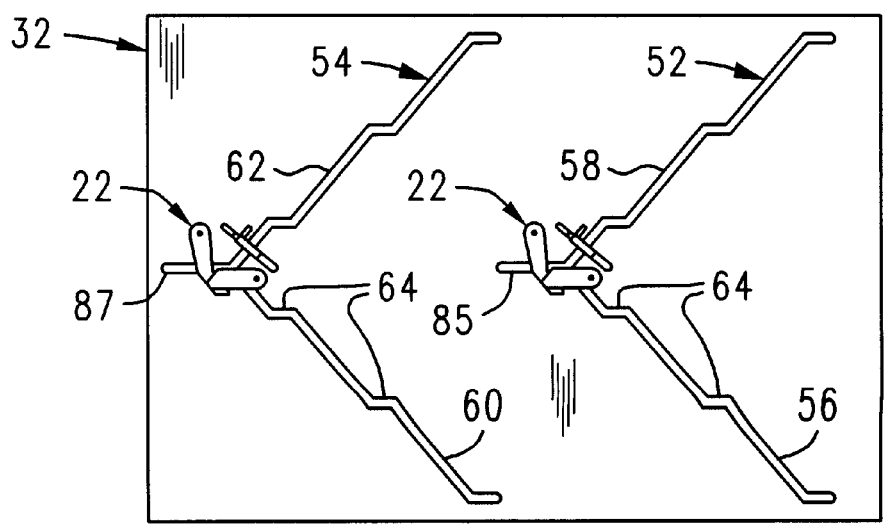
FIG. 5 is a right side view in elevation of the right side sliding plate.

The arrangement of the right side fixed and sliding plates 30 and 32 is similar to the left side fixed and sliding plates 26 and 28, except that the right side fixed plate 30 includes two elongate slots 44 and 46 that are sized to slidably receive a pair of right side pins 48 and 50 (FIG. 3) that are attached to the media access device 16. Similarly, the right side sliding plate 32 includes a pair of position indexing tracks 52, 54, each of which includes respective first and second inclined branch sections 56, 58 and 60, 62, as best seen in FIG. 5. The position indexing tracks 52, 54 are also sized to slidably receive the respective right side pins 48 and 50. A switching device 22 located at each of the intersections of the first and second inclined branch sections 56, 58 and 60, 62 directs the right side pins 48 and 50 between the upper and lower branch sections 56, 58 and 60, 62 of the respective position indexing tracks 52 and 54.

Each of the first and second branch sections 40, 42, 56, 58, 60, and 62 of the respective position indexing tracks 38, 52, and 54 includes a plurality of horizontal or dwell sections 64. Each horizontal or dwell section 64 corresponds to a specific vertical position 88 (FIG. 4) wherein the media access device 16 is aligned with a data cartridge 14 positioned within the cartridge storage array 18. Accordingly, when the left and right side pins 36 and 48, 50 are located at corresponding dwell sections 64, the media access device 16 will be positioned so that it may access the data cartridge 14 stored at the corresponding location in the cartridge storage array 18 (FIG. 2).

Figure 4:
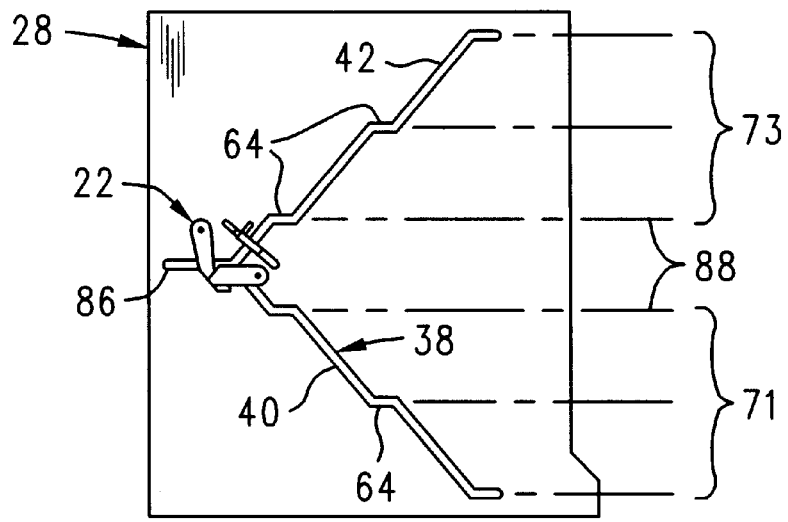
FIG. 4 is a left side view in elevation of the left side sliding plate.

The media access device 16 is raised and lowered to the various vertical positions 88 by the cooperative actions of the sliding plates 28 and 32, the fixed plates 26 and 30, and the respective left and right side pins 36 and 48, 50. More specifically, the actuator system 24 moves the left and right side sliding plates 28 and 32 with respect to the respective left and right side fixed plates 26 and 30. This relative movement causes the pins 36 and 48, 50 to be moved up and down the respective slots 34 and 44, 46 in the fixed plates 26 and 30 as the pins 36 and 48, 50 travel along the position indexing tracks 38 and 52, 54 in the sliding plates 26, 30. The actuator system 24 may be operated so that it stops the motion of the sliding plates 28 and 32 when the pins 36 and 48, 50 are located at the dwell sections 64 that correspond to the desired height or vertical position 88 (FIG. 4).

In one preferred embodiment, the actuator system 24 comprises a motor 68 which may be mounted to the fixed plate 30. A drive pinion 70 mounted on the output shaft of motor 68 engages a rack 72 attached to the right side sliding plate 32. The rack 72 transforms the rotary motion of the drive pinion 70 into linear or sliding motion of the sliding plate 32. A crank assembly 74 mounted for rotation about crank axis 76 connects the right side sliding plate 32 to the left side sliding plate 28 so that the sliding motion of the two plates 32 and 28 is synchronized. The mechanical arrangement of the actuator system 24 is such that the left and right side sliding plates 28 and 32 move in opposite directions. That is, when the motor 68 moves the right side sliding plate 32 in the direction of arrow 67, the left side sliding plate 28 moves in the direction of arrow 66 (i.e., in the opposite direction).

As was mentioned above, the lift system 10 may be used to raise and lower the media access device 16 so that it can access the various data cartridges 14 stored in the cartridge storage array 18. In order to access all of the storage positions in the cartridge storage array 18, it is necessary for the actuator system 24 to move the media access device 16 from vertical positions 88 in the low range 71 (FIG. 4) (i.e. those positions 88 that can only be reached when the left and right side pins 36 and 48, 50 are located in the first or lower inclined branch sections 40 and 56, 60 of the respective position indexing tracks 38 and 52, 54) to vertical positions 88 in the high range 73 (i.e., those positions 88 that can only be reached when the left and right side pins 36 and 48, 50 are located in the second inclined branch sections 42 and 58, 62 of the respective position indexing tracks 38 and 52, 54) and vice-versa. The switching devices 22 mounted on the left and right side sliding plates 28 and 32 direct the left and right side pins 36 and 48, 50 between the lower branch sections 40 and 56, 60 and the upper branches 42 and 58, 62 so that this may occur.

Consider, for example, the operational situation illustrated in FIG. 1 wherein the media access device 16 is located at the lowermost vertical position 88 in the low range 71 (i.e., the left side pin 36 and right side pins 48, 50 are located at the lowermost dwell section 64 in the position indexing tracks 38 and 52, 54), and it is desired to elevate the media access device 16 to a vertical position 88 located in the high range 73 (i.e., a position that corresponds to the dwell sections 64 that are located on the upper inclined branch sections 42 and 58, 62). The following description is directed to the left side plate/pin assembly since the details thereof are more completely shown in FIG. 1. However, identical events and functions occur simultaneously with respect to the right side plate/pin assembly.

To accomplish the foregoing elevation, the actuator system 24 begins moving the left side sliding plate 28 in the direction of arrow 66. As the left side sliding plate 28 moves in the direction of arrow 66, the left side pin 36 is caused to move upwardly within slot 34 in the left side fixed plate 26 due to the cooperative action of the left side pin 36 in the inclined slot in the first or lower branch section 40 of position indexing track 38. The same operation occurs with respect to the right side pins 48 and 50, except that the right side sliding plate 32 moves in the direction of arrow 67. That is, the right side pins 48 and 50 are caused to move upwardly in their respective slots 44 and 46 by the cooperative action of the right side pins 38 and 40 in the inclined slots in the respective lower branch sections 56 and 60 in right side sliding plate 32. See FIG. 5.

Once the left side pin 36 reaches the switching device 22, the actuator system 24 reverses the direction of movement of the sliding plates 28 and 32. That is, the actuator system 24 now moves the right side sliding plate 32 in the direction of arrow 66 and the left side sliding plate 28 in the direction of arrow 67. At this point, the switching device 22 directs the left side pin 36 to the second or upper inclined branch section 42. The switching devices 22 on the right side sliding plate 32 do the same thing with respect to the right side pins 48 and 50. As the left side sliding plate 28 continues to move in the direction of arrow 67, the cooperative action of the left side pin 36 in the inclined slot of upper branch section 42 causes the left side pin 36 to continue climbing in slot 34, which elevates the left side of the media access device 16. The right side pins 48 and 50 (thus the right side of the media access device 16) are elevated in a similar manner due to the cooperative action of the right side pins 48 and 50 in the inclined slots in the respective upper branch sections 58 and 62. See FIG. 5. Thereafter, the actuator system 24 may stop the motion of the sliding plates 28 and 32 when the respective pins 36 and 48, 50 are at the dwell sections 64 that correspond to the desired vertical position 88 of the media access device 16.

Figure 7A:
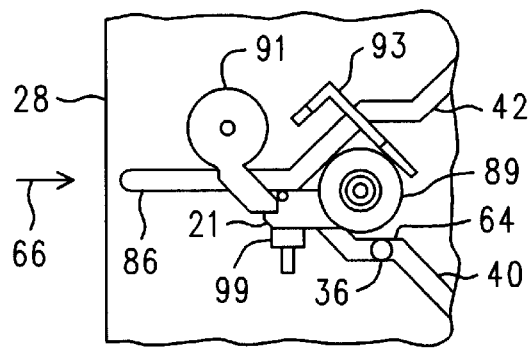
FIGS. 7(a–g) are elevation views showing how the switching device directs the pin between the upper and lower inclined branch sections of the position indexing track.
Figure 7B:
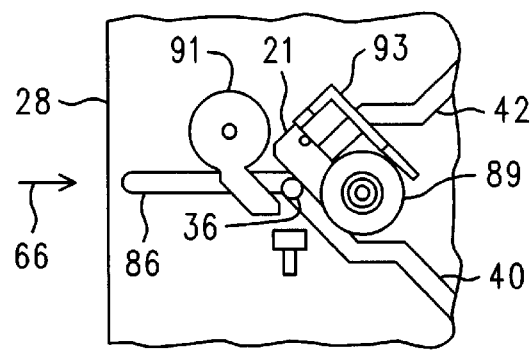
Figure 7C:
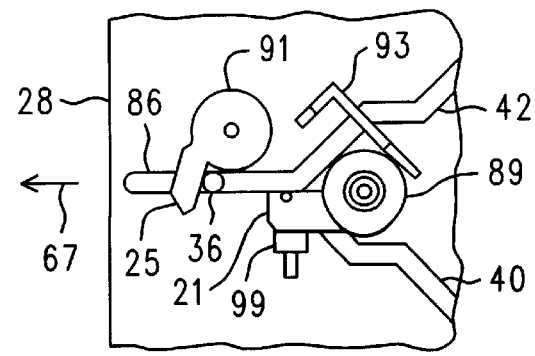
Figure 7D:
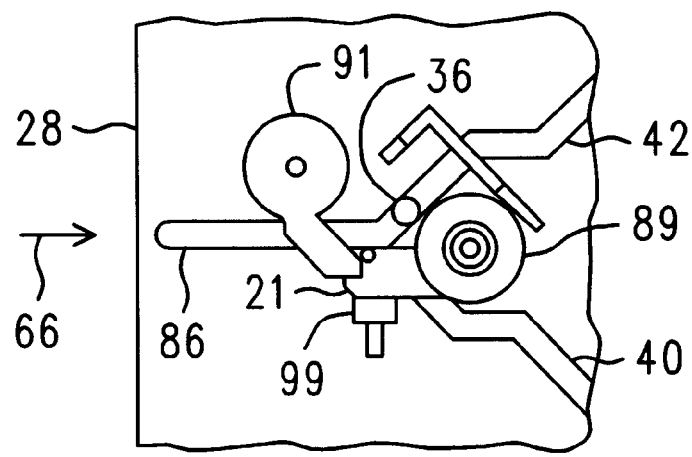
Figure 7E:
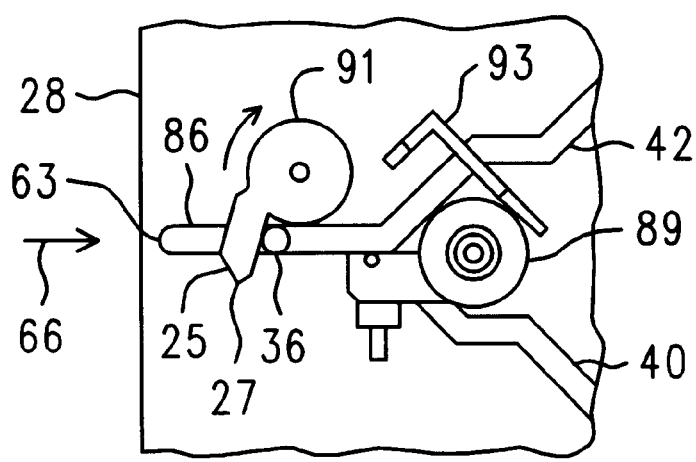
Figure 7F:
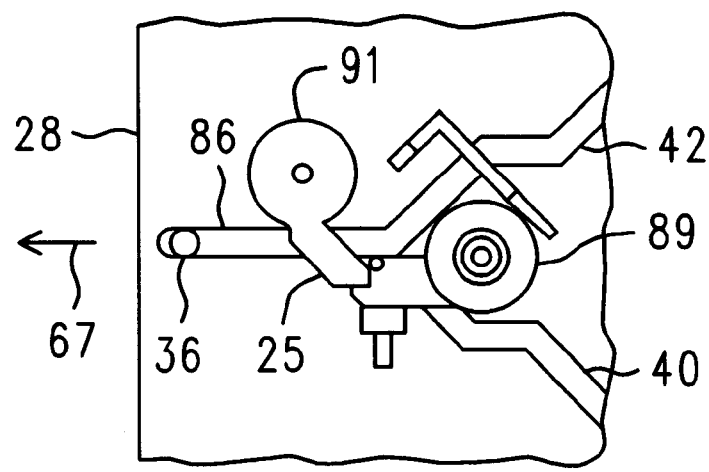
Figure 7G:
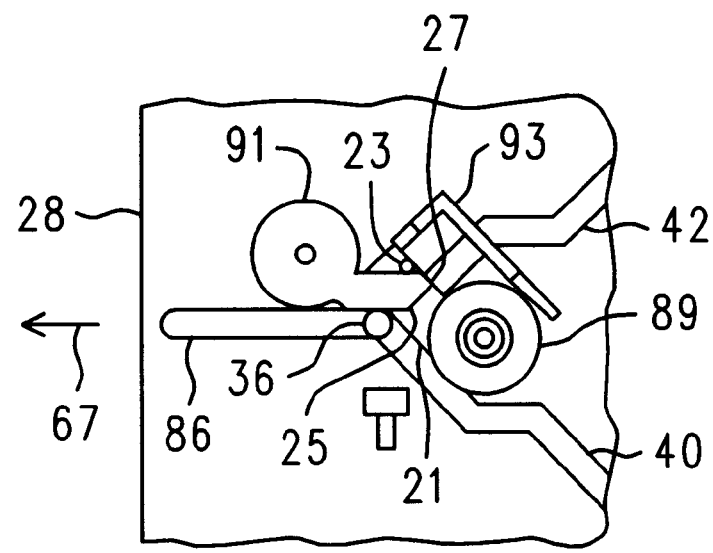

If it is desired to move the media access device 16 to a position on the lower branch 40 from the upper branch 42, the actuator system 24 moves the left side sliding plate 28 in the direction of arrow 66 which causes the left side pin 36 to descend along slot 34 in fixed plate 26, thus lowering the left side of the media access device 16. When the pin 36 reaches the switching device 22, the actuator system 24 continues to move the left side sliding plate 28 in the direction of arrow 66 to a switch actuation position (FIG. 7f), which causes the switching device 22 to be placed in a state so that it will direct the left side pin 36 to the lower branch section 40 when the actuator system 24 begins to move the sliding plate in the direction of arrow 67. The same events occur with respect to the right side pins 48 and 50, except that the right side sliding plate 32 moves in the opposite direction.

A significant advantage associated with the lift system 10 according to the present invention is that it provides a relatively simple means for accurately and precisely moving an object, such as a cartridge access device, along an axis. Another advantage is that the switching device 22 allows the position indexing track (e.g., track 38) in the sliding plates to be "folded" into two or more inclined branch sections, which provides for increased vertical lift while at the same time reducing the width of the sliding plates and reducing the amount of space required to accommodate the sliding motion of the plates. Still another advantage associated with the switching device 22 is that it is actuated by the pin (e.g., pin 36), thereby obviating the need for a separate actuator to cause the switching device to direct the pin between the lower and upper inclined branch sections of the position indexing track.

Still other advantages are associated with the actuator system 24. For example, the actuator system requires only a single actuating device (e.g., motor 68) to move both sliding plates 28 and 32. Further, since the motion of the sliding plates 28 and 32 is coordinated by the crank assembly 74, the actuator system 24 ensures coordinated movement of both of the sliding plates 28 and 32 without the need for position feedback mechanisms or other like devices to ensure that the two sliding plates 28 and 32 are moved synchronously.

Having briefly described the lift system 10, as well as some of its more significant features and advantages, the lift system 10 according to the present invention will now be described in detail. However, before proceeding with the detailed description it should be noted that while the lift system 10 is shown and described herein as it could be used to raise and lower a media access device 16 associated with a juke box data storage system 12, it also could be used in any of a wide range of other devices and applications wherein it is required to raise and lower objects between two or more defined vertical positions. Consequently, the lift system 10 should not be regarded as limited to the particular application shown and described herein.

Referring back now to FIGS. 1–3, the lift system 10 may be used to raise and lower a media access device 16 associated with a juke box data storage system 12. Basically, the juke box data storage system 12 may comprise a housing or chassis assembly 78 for housing the various components of the lift system 10, as well as a media access device 16, cartridge storage array 18, and a plurality of data cartridges 14. The chassis assembly 78 may also house various ancillary devices, such as power supplies, electronic control and data processing systems, etc. (not shown), commonly associated with such juke box data storage systems.

In one preferred embodiment, the media access device 16 may comprise a read/write device having a suitable mechanism (not shown) for grasping a data cartridge 14 from the cartridge storage array 18 and drawing it into the media access device 16 so that the same may be written to or read from. In an alternate embodiment, the media access device could comprise a cartridge engaging assembly for grasping the data cartridges 14 and carrying them to a separate read/write device (not shown). In any event, since the details of the particular type of media access device, data cartridge, and cartridge storage array are not necessary for the understanding of the lift system 10, the particular media access device 16, data cartridge 14, and cartridge storage array 18 utilized in one preferred embodiment will not be described in further detail.

Still referring primarily to FIGS. 1–3, the lift system 10 according to one preferred embodiment of the present invention may comprise a pin-in-track position indexing apparatus 20, one or more switching devices 22, and an actuator system 24. The lift system 10 is used to raise and lower the media access device 16 to specific vertical positions 88 (FIG. 4) so that the same may access the data cartridges 14 stored in the cartridge storage array 18. For example, in the embodiments shown and described herein, the pin-in-track position indexing apparatus 20 is capable of positioning the media access device 16 at six (6) defined vertical positions 88, each of which corresponds to a dwell section 64 of each of the position indexing tracks 38 and 52, 54. However, the lift system 10 may provide for greater or fewer defined vertical positions by providing the various position indexing tracks with the corresponding number of dwell sections 64. Consequently, the present invention should not be regarded as limited to the six (6) vertical positions 88 shown and described herein.

The pin-in-track position indexing apparatus 20 comprises two sets of plates and pins, a left side set and a right side set. The left side set will be described first, followed by the right side set. Essentially, the left side set of plates and pins comprises a left side pin 36, a left side fixed plate 26, and a left side sliding plate 28. The left side pin 36 is attached to the object to be raised and lowered (e.g., the media access device 16). In one preferred embodiment, the left side pin 36 is attached to a left side mounting bracket 82. The left side mounting bracket 82 may then be secured to the media access device 16 (or a carriage assembly (not shown) for carrying the media access device 16) by any convenient fastening system, such as by screws 84. See FIG. 2. Alternatively, the left side pin 36 may be mounted directly to the media access device 16.

The left side fixed plate 26 is provided with an elongate vertical slot 34 that extends along the entire length of vertical travel to be provided for the media access device 16. The elongate vertical slot 34 is sized to slidably receive the left side pin 36. The lower end of the left side fixed plate 26 may be provided with a notched section 98 to accommodate the leg section 90 of sliding plate 28. The upper and lower ends of the left side fixed plate 26 may be attached to the chassis 78 of the juke box data storage system 12 by any convenient means, such as by a plurality of tabs 80 which may be fastened to the chassis 78 by any convenient fastening device, such as by screws (not shown).

The left side sliding plate 28 is positioned outboard of the fixed plate 26 so that it is free to slide back and forth along the left side fixed plate 26 in the direction indicated by arrows 66 and 67. In one preferred embodiment, the left side sliding plate 28 is provided with a leg section 90 to allow the crank assembly 74 to be connected to the left side sliding plate 28. The left side sliding plate 28 includes a position indexing track 38 therein that is sized to slidably receive the left side pin 36. See FIGS. 1 and 4. In one preferred embodiment, the position indexing track 38 comprises a first or lower inclined branch section 40 and a second or upper inclined branch section 42. The two inclined branch sections 40 and 42 are joined by a horizontal intersecting branch section 86, as best seen in FIG. 4. Each of the inclined branch sections 40 and 42 also includes one or more horizontal dwell sections 64 which are positioned along the branch sections 40, 42 so that they correspond to desired vertical positions 88. In the embodiment shown and described herein, each vertical position 88 corresponds to a cartridge storage location in the cartridge storage array 18.

A switching device 22 is mounted to the left side sliding plate 28 at about the intersection of the upper and lower inclined branches 40 and 42 and directs the left side pin 36 to the appropriate branch section. The switching device 22 will be described in greater detail below.

The right side portion of the pin-in-track position indexing apparatus 20 is similar to the left side portion just described, except that the right side portion includes a pair of pins 48, 50 which engage corresponding pairs of slots and tracks in the fixed and sliding plates 30 and 32. As was the case for the left side pin 36, the right side pins 48, 50 are attached to the right side of the object to be raised and lowered, e.g., the media access device 16. In one preferred embodiment, the right side pins 48, 50 are attached to a right side mounting bracket 83 which may be fastened to the media access device 16 by any convenient fastening device, such as by screws (not shown) in a manner similar to that used to attach the left side bracket 82 to the left side of the media access device 16. Alternatively, the right side pins 48, 50 could be attached directly to the media access device 16.

The right side fixed plate 30 is provided with a pair of elongate slots 44, 46, each of which extends along the entire length of vertical travel to be provided for the media access device 16. Each elongate vertical slot 44, 46 is sized to slidably receive the corresponding right side pins 48, 50. The lower end of the right side fixed plate 30 may include a notched section 94 to accommodate the rack 72 and leg section 96 of sliding plate 32. The right side fixed plate may be mounted to the chassis 78 by a plurality of tabs 92 which may be attached to the chassis 78 by any convenient device, such as by screws (not shown).

The right side sliding plate 32 is positioned outboard of the right side fixed plate 30 so that it is free to slide back and forth along the fixed plate 30 in the direction indicated by arrows 66 and 67. Referring now to FIG. 5, the sliding plate 32 also includes a pair of position indexing tracks 52, 54, each of which is sized to slidably receive the respective right side pins 48, 50. Each position indexing track 52, 54 includes respective first or lower inclined branch sections 56, 60 and second or upper inclined branch sections 58, 62. The two branch sections 56, 58 of position indexing track 52 are joined by a horizontal intersecting branch section 85. Similarly, the two branch sections 60, 62 of position indexing track 54 are joined by a horizontal intersecting branch section 87. Each of the inclined branch sections 56, 58, 60, and 62 also includes one or more horizontal dwell sections 64 positioned so that they correspond to the dwell sections 64 in the left side sliding plate 28, thus the vertical positions 88. See also FIG. 4. A pair of switching devices 22 are mounted to the right side sliding plate 32 at about the intersections of the upper and lower inclined branch sections 56, 58 and 60, 62 of each position indexing track 52, 54. The switching devices 22 direct the right side pins 48 and 50 to the appropriate branch sections in the respective position indexing tracks 52, 54 in the manner that will be described below.

The left and right side fixed and sliding plates 26, 30 and 28, 32 may be fabricated from any of a wide range of materials suitable for the intended application, such as metal or plastic. Consequently, the present invention should not be regarded as limited to plates being fabricated from any particular material. By way of example, in one preferred embodiment, both the fixed and sliding plates 26, 30 and 28, 32 are fabricated from sheet metal. It is preferred, but not required, that the slots 34 and 44, 46, and tracks 38 and 52, 54 therein be coated with a low friction material (e.g., Teflon®) to provide a low-friction bearing surface for the left and right side pins 36 and 48, 50. Alternatively, the slots 34 and 44, 46, and tracks 38 and 52, 54 could be defined by inserts (not shown) made from a low friction material, e.g., Delrin®. The left and right side mounting brackets 82, 83 may also be fabricated from sheet metal, although other materials could also be used. The left and right side pins 36 and 48, 50 may comprise a steel pins, each of which may have a diameter of about 4 mm, although other materials and diameters could also be used. In the embodiment wherein the diameters of the left and right side pins 36 and 48, 50 are about 4 mm, the slots 34 and 44, 46, and position indexing tracks 38 and 52, 54 may have widths of about 4.1 mm, which provides a balance between a low-friction sliding fit and good position precision.

While the foregoing embodiment is directed to a lift system 10 having three pins 26 and 48, 50 riding in corresponding elongate vertical slots 34 and 44, 46 and position indexing tracks 38 and 52, 54, more pins could be used. For example, an alternate embodiment could utilize four pins; two on the left side and two on the right side. In still another alternative, even more pins could be used. Consequently, the present invention should not be regarded as limited to the three pin arrangement shown and described herein.

The actuator system 24 moves the left and right side sliding plates 28 and 32 back and forth adjacent their respective fixed plates 26 and 30 in the directions indicated by arrows 66 and 67 to raise and lower the media access device 16. More specifically, the actuator system 24 may comprise a motor 68 which may be mounted to the right side fixed plate 30. Alternatively, the motor 68 may be mounted directly to the chassis 78. A drive pinion 70 mounted to the output shaft of the motor 68 engages a rack assembly 72 mounted to the right side sliding plate 32. The rack assembly 72 converts the rotary motion of the drive pinion 70 into linear motion of the sliding plate 32. Consequently, when the motor 68 is operated, the drive pinion 70 moves the rack assembly 72, thus the right side sliding plate 32 back and forth in the direction of arrows 66 and 67. In one preferred embodiment, an electronic motor control system (not shown) connected to the motor 68 is used the actuate the motor 68 to move the sliding plates 28 and 32 by the amounts necessary to raise and lower the media access device 16 to the desired vertical position 88. However, since such electronic motor control systems are well-known in the art and could be readily provided by persons having ordinary skill in the art after having become familiar with the present invention, the particular electronic motor control system utilized in one preferred embodiment will not be described in further detail.

The left side sliding plate 28 is connected to the right side sliding plate 32 by the crank assembly 72. Crank assembly 72 is pivotally mounted to the chassis 78 so that it is free to rotate about crank axis 76. Each end of the crank assembly 72 is mounted to the leg section 90, 96 of each respective sliding plate 28, 32 so that the crank assembly 74 moves each sliding plate 28, 32 together (but in opposite directions) and in a synchronized manner. That is, if the motor 68 moves the right side sliding plate 32 in the direction of arrow 67, the crank assembly 74 moves the left side sliding plate 28 in the direction of arrow 66. In one preferred embodiment, each end of the crank assembly 72 includes an elongate slot 57 sized to fit over a pin 59 on the leg section 90, 96 of each respective sliding plate 28, 32. Alternatively, other mounting arrangements could also be used.

Figure 6:
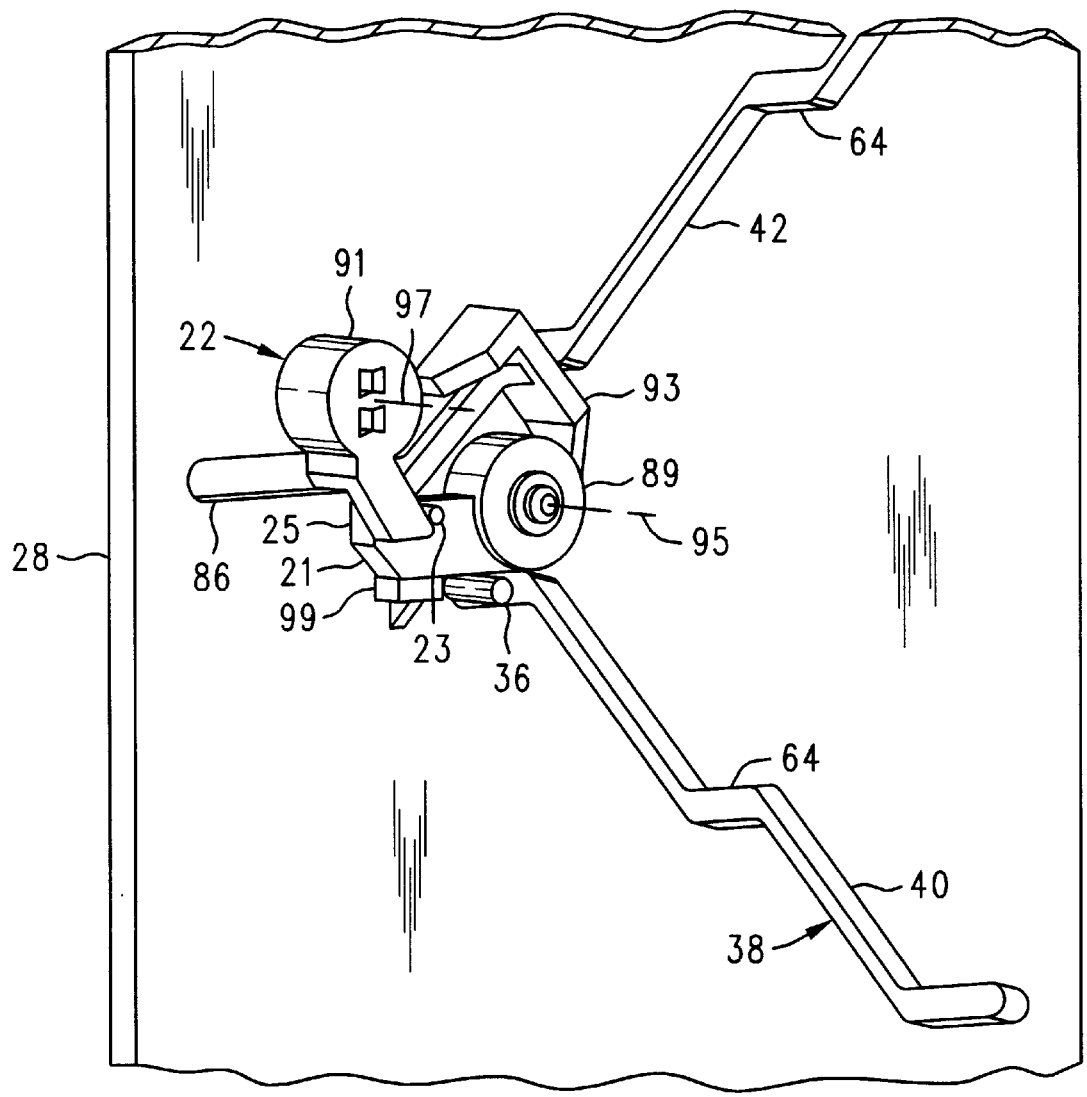
FIG. 6 is a perspective view of the switching device on the left side sliding plate.

Referring now to FIGS. 6 and 7(*a–g*) each switching device 22 may comprise a gate member 89, a switch member 91, a first stop member 93 and a second stop member 99. Both the gate and switch members 89 and 91 are pivotally mounted to the sliding plate (e.g., left side sliding plate 28) so that they are free to pivot about respective axes 95, 97. The first and second stop members 93 and 99 may be fixedly mounted to the sliding plate (e.g., plate 28) in the positions shown.

Gate member 89 may include an elongate gate section 21 from which projects a pin 23. Gate member 89 is pivotally mounted to the sliding plate (e.g., plate 28) so that it is free to pivot about gate axis 95 from a first position (shown in FIG. 6) to a second position (shown in FIGS. 7(*b*) and 7(*g*)). Gate member 89 may be biased toward the first position by any of a wide range of suitable devices, such as a spring (not shown). Alternatively, the action of gravity may be used to bias gate member 89 toward the first position.

The switch member 91 may include an elongate paddle section 25 which is adapted to engage the pin 23 of gate section 21. Switch member 91 is pivotally mounted to the sliding plate (e.g., plate 28) so that it is free to pivot about switch axis 97 from a first position (shown in FIG. 6) to either a second position (shown in FIGS. 7(*c*) and 7(*e*)) or a third position (shown in FIG. 7(*g*)). Switch member 91 may be biased toward the first position by any of a wide range of suitable devices, such as a spring (not shown). Alternatively, gravity may be used to bias the switch member 91 toward the first position.

The various components (e.g., the gate member 89, switch member 91, first stop member 93 and second stop member 99) of the switching device 22 may be made from any of a wide range of materials (e.g., metals or plastics) suitable for the intended application. Consequently, the switching device 22 should not be regarded as being limited to any particular material. By way of example, in one preferred embodiment, the gate member 89 is made from a polycarbonate plastic material having about 5% by weight carbon (graphite) and about 5% by weight Teflon® added as friction modifiers. The switch member 91 may be made from nylon having about 5% by weight carbon (graphite) and about 5% by weight Teflon® added. Fabricating the gate member 89 and switch member 91 from different materials tends to improve the operation of the switching device 22 by modifying the coefficient of friction between the two components. Alternatively, the gate member 89 may be fabricated from the nylon composite material and the switch member 91 from the polycarbonate composite material. The balance of the components of the switching device 22 (e.g., the first stop member 93 and second stop member 99) may be fabricated from either the nylon or polycarbonate materials, or any other material suitable for the intended application.

The various switching devices 22 are actuated by the pins (e.g., pin 36) and direct the pins between the upper and lower branches (e.g., 40, 42) of the position indexing tracks (e.g., 38). Consequently, the switching devices 22 do not require separate actuation devices to function. The following operational description of the switching device 22 is directed to the left side sliding plate 28. However, the operation of the switching device 22 is identical whether it is located on the left side sliding plate 28 or the right side sliding plate 32.

Before proceeding with the detailed description of the operation of the switching device 22, it should be remembered that the various pins (e.g., 36 and 48, 50) move only vertically and not horizontally. That is, the various pins 36 and 48, 50 are prevented from moving in the horizontal direction by the respective elongate slots 34 and 44, 46 in the left and right side fixed plates 26 and 30. Consequently, any notion of "horizontal movement" of the pins is really the result of the horizontal movement of the sliding plates 28 and 32 with respect to the various pins, and not the result of the pins moving horizontally with respect to the sliding plates 28 and 32. In the following description, however, it is sometimes more convenient to describe the pins as moving in the horizontal direction with respect to the sliding plates even though it is the sliding plates, and not the pins, that move horizontally. In any event, it should be remembered that any horizontal movement between the pins (e.g., 36 and 48, 50) and the sliding plates (e.g., 28, 32) is the result of the horizontal motion of the sliding plates (e.g., 28, 32) with respect to the various pins (e.g., 36 and 48, 50), and not the result of the pins moving horizontally with respect to the sliding plates.

Referring now to FIGS. 7(*a–c*) the switching device 22 may be used to direct the left side pin 36 from the first or lower inclined branch section 40 to the second or upper inclined branch section 42 of position indexing track 38. Consider, for example, an initial condition wherein the left side pin 36 is located at a dwell section 64 of the lower branch section 40. In order to move the left side pin 36 to the upper branch section 42, the actuator system 24 begins moving the left side sliding plate 28 in the direction of arrow 66. See also FIG. 1. As the pin 36 ascends the lower branch section 40 (i.e., as a result of the left side sliding plate 28 moving with respect to the horizontally stationary left side pin 36) the left side pin 36 eventually contacts the gate section 21 of gate member 89 and begins rotating it toward the second position, ultimately causing the gate section 21 to contact the first stop member 93. See FIG. 7(*b*). As the sliding plate 28 continues to move in the direction of arrow 66, the gate section 21 of gate member 89 directs the left side pin 36 to the horizontal intersecting branch section 86. The left side pin 36 enters the branch section 86, eventually contacting the paddle section 25 of the switch member 91 and rotating it toward the second position. As the horizontal branch section 86 continues to move with respect to the pin 36, the pin 36 eventually clears the gate section 21 of gate member 89 which allows the gate member 89 to return to the first position, i.e., against the second stop member 99. See FIG. 7(*c*).

Once the gate member 89 has returned to the first position, the switching device 22 is in a state to direct the pin 36 to the upper branch section 42. This is accomplished when the actuator system 24 reverses the direction of the left side sliding plate 28. That is, the actuator system 24 stops the sliding plate 28 from moving in the direction of arrow 66 and begins moving the plate 28 in the reverse direction (i.e., in the direction of arrow 67). See FIGS. 1 and 7(*c*). As the sliding plate 28 moves in the direction of arrow 67, the gate section 21 of gate member 89 prevents the pin 36 from entering the lower branch section 40 and instead directs pin 36 to the upper branch section 42. This condition is illustrated in FIG. 7(*d*). Thereafter, the actuator system 24 may stop the motion of the sliding plate 28 when the pin 36 has reached the desired dwell section 64 of the upper branch section 42 that corresponds to the desired vertical position 88. See FIG. 4.

The switching device 22 may also be used to direct the pin 36 from the upper branch section 42 to the lower branch section 40, as best seen in FIGS. 7(*d–g*). Consider, for example, the situation shown in FIG. 7(*d*) where the left side pin 36 is in the upper branch section 42 and the left side sliding plate 28 is moving in the direction of arrow 66. The movement of the sliding plate 28 in the direction of arrow 66 causes the pin 36 to descend the upper branch section 42. When the pin 36 reaches the intersection of the upper and lower branch sections 42 and 40 at the location of the horizontal intersecting branch 86, the gate section 21 of the gate member 89 directs the pin 36 to the horizontal intersecting branch 86. As the sliding plate 28 moves in the direction of arrow 66, the pin 36 moves along the horizontal intersecting branch 86, eventually contacting the paddle section 25 of switch member 91 and rotating it toward the second position. See FIG. 7(*e*). Continued movement of the sliding plate 28 in the direction of arrow 66 causes the pin 36 to continue moving along the horizontal intersecting branch section 86 until the pin 36 clears the tip 27 of the paddle section 25, i.e., when the pin 36 nears the end 63 of the horizontal intersecting branch section 86. As soon as the pin 36 clears the tip 27 of the paddle section 25, the switch member 91 returns to the first position, as shown in FIG. 7(*f*).

At this time, the actuator system 24 reverses the direction of motion of the sliding plate 28 so that the sliding plate 28 begins to move in the direction of arrow 67. As the pin 36 moves along the horizontal intersecting branch section 86 it again contacts the paddle section 25 of the switch member 91, but this time causes it to begin rotating toward the third position shown in FIG. 7(*g*). As the pin 36 causes the switch member 91 to rotate toward the third position, the tip 27 of the paddle section 25 contacts the pin 23 of the gate member 89 which rotates the gate member 89 toward the second position. Ultimately, the gate section 21 of gate member 89 contacts the first stop member 93. The gate section 21 of gate member 89 thereafter directs the pin 36 to the lower inclined branch section 40 as the sliding plate 28 continues to move in the direction of arrow 67. The actuator system 24 may subsequently stop the movement of the sliding plate 28 when the pin 36 has reached the appropriate dwell section 64 in the lower branch section 40.

While the foregoing description of the switching device 22 was directed to the left side sliding plate 28 and pin 36, the operations of the switching devices 22 on the right side sliding plate 32 are essentially identical even though the right side switching plate 36 moves in the opposite direction.

As was mentioned above, the lift system 10 according to the present invention may be provided with any number of branches and dwell sections to allow a greater vertical range of movement or to provide for an increased number of vertical positions. Further, this expansion may be accomplished by changing only the fixed and sliding plates 26, 30 and 28, 30 to provide longer slots 34 and 44, 46 and tracks 38 and 52, 54. The actuator system 24 may remain essentially identical.

Figure 8:
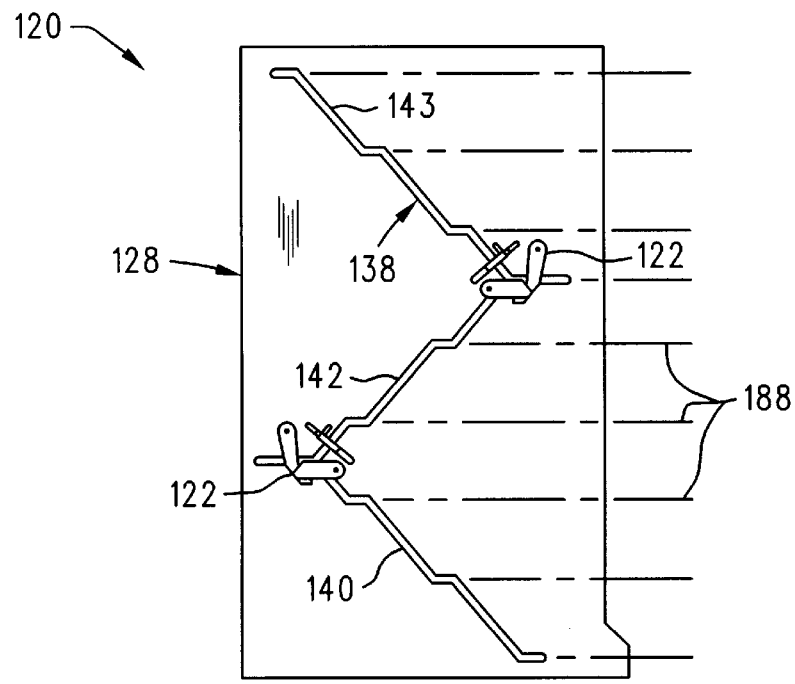
FIG. 8 is a left side view in elevation of an alternate embodiment of a left side sliding plate having three inclined branch sections and two switching devices to provide increased lift.
Figure 9:
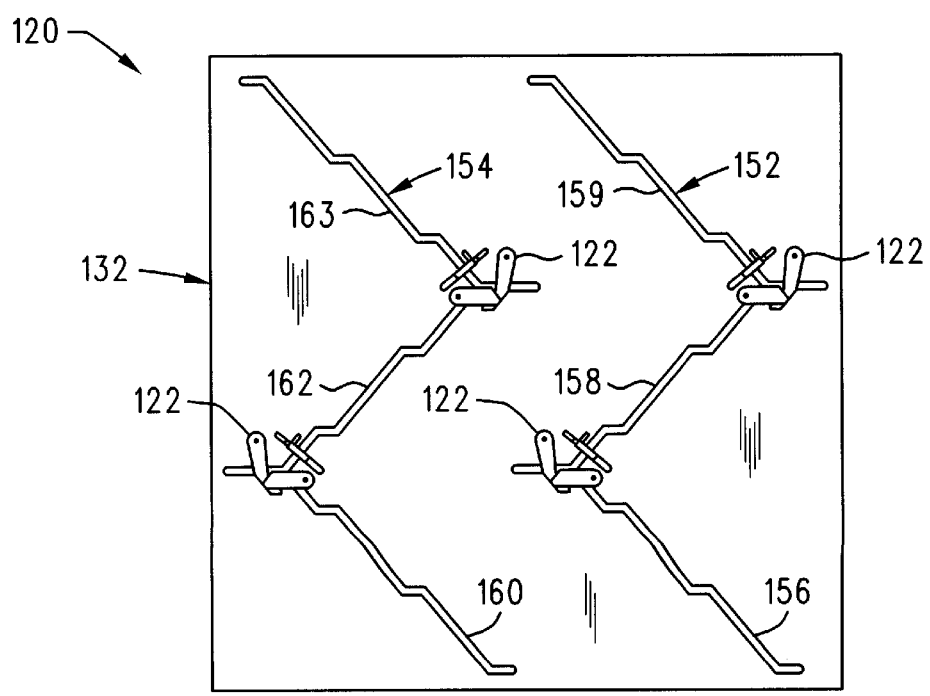
FIG. 9 is a right side view in elevation of an alternate embodiment of a right side sliding plate that could be used with the left side sliding plate shown in FIG. 8.

Referring now to FIGS. 8 and 9, the lift system 10 according to the present invention may be provided with a pin-in-track position indexing apparatus 120 having increased vertical lift. The position indexing apparatus 120 may comprise a left side sliding plate 128 having a position indexing track 138 with three inclined branch sections 140, 142, and 143 which provide a total of nine (9) vertical positions 188. A pair of switching devices 122 are positioned at about the intersections of the inclined branch sections 140, 142, and 143 to direct the left side pin to the appropriate branch in the manner just described.

The right side sliding plate 132 is similar to the left side sliding plate 128, except that it includes a pair of position indexing tracks 152, 154, each of which includes three inclined branch sections. That is, position indexing track 152 includes first, second, and third branch sections 156, 158, and 159, whereas position indexing track 154 includes first, second, and third branch sections 160, 162, and 163. Each position indexing track 152, 154 includes a pair of switching devices 122 to direct the right side pins to the appropriate branch.

The sliding plates 128 and 132 shown in FIGS. 8 and 9 provide increased vertical lift and an increased number of vertical positions 188 compared to the sliding plates 28 and 32. The same actuator system 24 may be used, except that it would provide for an additional reversal sequence to allow the pins to transition between the second and third inclined branch sections. Such an additional reversal sequence could be easily accomplished by re-programming the electronic motor control system (not shown) to perform the additional reversal sequence.

Figure 10:
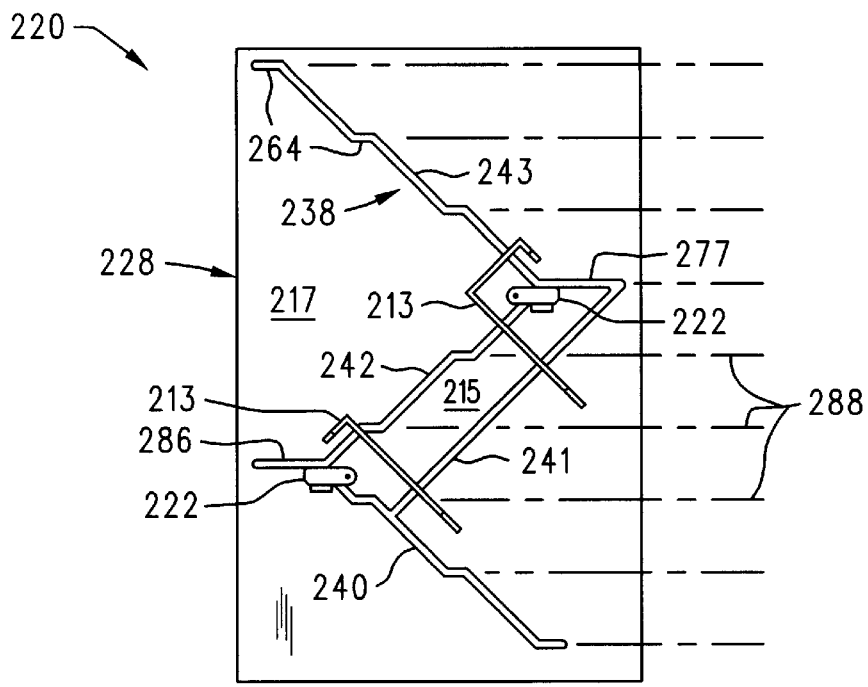
FIG. 10 is a left side view in elevation of a third embodiment of a left side sliding plate having a separate descending branch section.
Figure 11:
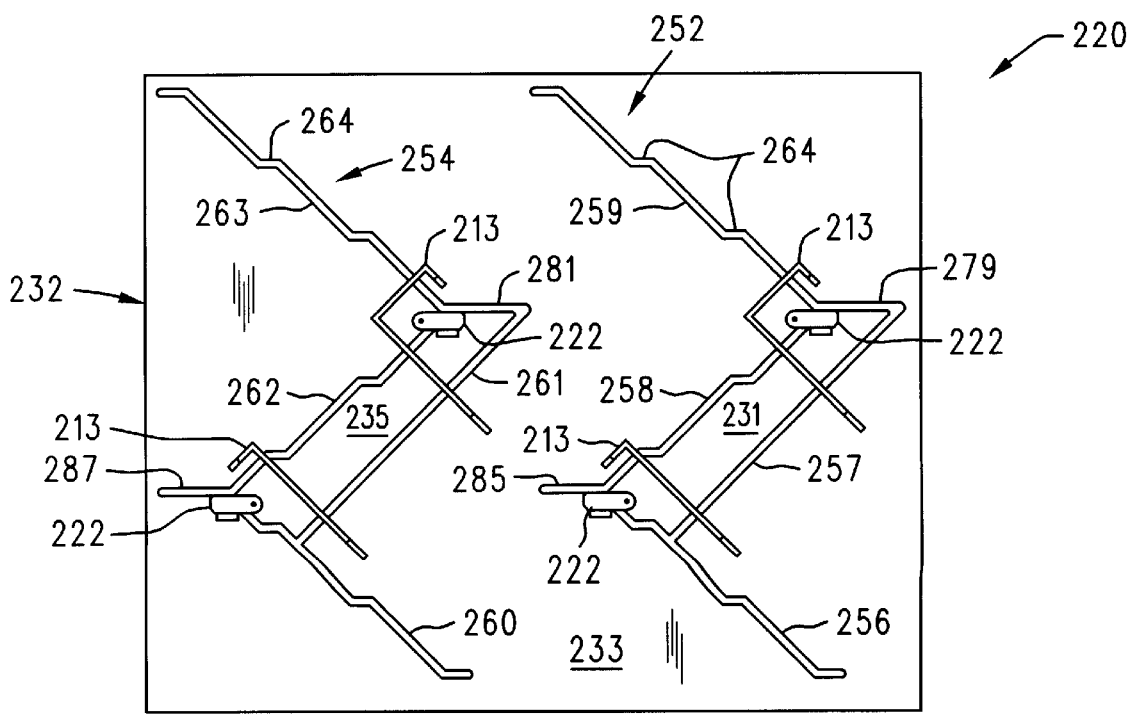
FIG. 11 is a right side view in elevation of an alternate embodiment of a right side sliding plate that could be used with the left side sliding plate shown in FIG. 10.

In still another embodiment, the lift system 10 may be provided with a pin-in-track position indexing apparatus 220 having a separate descending branch section 241 and modified switching devices 222, as best seen in FIGS. 10 and 11. This third embodiment 220 of the pin-in-track position indexing apparatus differs from both the first and second embodiments 20 and 120 described above in that the separate descending branch section 241 and modified switching devices 222 provide a dedicated descending pathway for the left side pin 36 (FIG. 1). More specifically, the descending branch section 241 allows the left side pin 36 to descend from the third branch section 243 to the first branch section 240, thus by-passing the second branch section 242. Since the pin 36 does not need to descend along the intermediate inclined branch section 242, the switching devices 222 need only operate so that they allow the pin 36 to ascend from one branch section to the next, but not to descend. Consequently, the switching devices may be modified by omitting the switch member portion, as will be described in greater detail below.

Referring now to FIG. 10, the left side sliding plate 228 of the third embodiment 220 of the pin-in-track position indexing system may be positioned outboard of the fixed plate 26 (FIG. 1) so that it is free to slide back and forth along the left side fixed plate 26 in the manner described above for the left side sliding plate 28 of the first embodiment 20 of the pin-in-track position indexing system. The left side sliding plate 228 is provided with a position indexing track 238 that is sized to slidably receive the left side pin 36. In the embodiment shown in FIG. 10, the position indexing track 238 includes a first or lower inclined branch section 240, a second or intermediate inclined branch section 242, and a third or upper inclined branch section 243. The lower and intermediate inclined branch sections 240 and 242 are joined by a lower horizontal intersecting branch section 286. Similarly, the intermediate and upper inclined branch sections 242 and 243 are joined by an upper horizontal intersecting branch section 277. Each of the inclined branch sections 240, 242, and 243 also includes one or more horizontal dwell sections 264 which are positioned along the branch sections 240, 242, and 243 so that they correspond to the desired vertical positions 288. For example, in the embodiment shown in FIG. 10, the left side sliding plate 228 is provided with nine (9) vertical positions 288, although any other number of vertical positions may be provided by increasing or decreasing the number of horizontal dwell sections 264, in the manner described for the previous embodiments.

In addition to the three branches 240, 242, and 243 described above, the position indexing track 238 of the left side sliding plate 228 is also provided with a descending branch section 241 that connects the upper horizontal intersecting branch 277 and the first or lower inclined branch section 240 in the manner best seen in FIG. 10. The descending branch section 241 provides a path that allows the pin 36 to descend directly from the upper inclined branch section 243 to the lower inclined branch section 240, thus by-passing the intermediate inclined branch section 242.

As is best seen in FIG. 10, the addition of the descending branch section 241 creates a loop section 215 in the sliding plate 228 that is no longer attached to the main section 217.

Therefore, in order to hold the loop section 215 in the proper position with respect to the main section 217, the left side sliding plate 228 is also provided with a pair of bridge members 213. Each bridge member 213 is connected or attached to the loop section 215 and the main body section 217 and includes slots 237 positioned at the appropriate locations to allow the pin 36 to move along the various branches of the position indexing track 238. See FIG. 12.

The left side sliding plate 228 is also provided with a pair of modified switching devices 222 that are mounted at about the intersections of the inclined branches 240, 242, and 243. The modified switching devices 222 direct the left side pin 236 from the lower branch 240 to the intermediate branch 242, and from the intermediate branch 242 to the upper branch 243. The modified switching devices 222 will be described in greater detail below.

The right side sliding plate 232 is best seen in FIG. 11 and may be positioned outboard of the right side fixed plate 30 (FIG. 1) so that it is free to slide back and forth along the fixed plate 30 in a manner similar to the right side sliding plate 32 for the first embodiment 20 of the pin-in-track lift system. The right side sliding plate 232 includes a pair of position indexing tracks 252 and 254, each of which is sized to slidably receive the respective right side pins 48 and 50. The first position indexing track 252 includes a first or lower inclined branch section 256, a second or intermediate inclined branch section 258, and a third or upper inclined branch section 259. The lower and intermediate inclined branch sections 256 and 258 are joined by a lower horizontal intersecting branch section 285. Similarly, the intermediate and upper inclined branch sections 258 and 259 are joined by an upper horizontal intersecting branch section 279. Each of the inclined branch sections 256, 258, and 259 also includes one or more horizontal dwell sections 264 which are positioned along the branch sections 256, 258, and 259 so that they correspond to the desired vertical positions 288 (FIG. 10).

The first position indexing track 252 of the right side sliding plate 232 is also provided with a descending branch section 257 that connects the upper horizontal intersecting branch 279 and the first or lower inclined branch section 256 in the manner best seen in FIG. 11. The descending branch section 257 provides a path that allows the right side pin 48 to descend from the upper inclined branch section 259 to the lower inclined branch section 256, thus by-passing the intermediate inclined branch section 258. A pair of bridge members 213 are also provided to the right side sliding plate 232. Each bridge member 213 is attached to the loop section 231 and main section 233 of the right side sliding plate 232, thereby connecting the loop section 231 to the main section 233 of sliding plate 232.

The second position indexing track 254 of the right side sliding plate 232 is essentially identical to the first position indexing track 252 and includes a first or lower inclined branch section 260, a second or intermediate inclined branch section 262, and a third or upper inclined branch section 263. The lower and intermediate inclined branch sections 260 and 262 are joined by a lower horizontal intersecting branch section 287. Similarly, the intermediate and upper inclined branch sections 262 and 263 are joined by an upper horizontal intersecting branch section 281. Each of the inclined branch sections 260, 262, and 263 also includes one or more horizontal dwell sections 264 which are positioned along the branch sections 260, 262, and 263 so that they correspond to the desired vertical positions 288 (FIG. 10).

The second position indexing track 254 of the right side sliding plate 232 is also provided with a descending branch section 261 that connects the upper horizontal intersecting branch 281 and the first or lower inclined branch section 260. The descending branch section 261 provides a path that allows the right side pin 50 to descend from the upper inclined branch section 263 to the lower inclined branch section 260, thus by-passing the intermediate branch section 262. A pair of bridge members 213 fixedly attached to the loop section 235 and main section 233 of the right side sliding plate 232 connect the loop section 235 to the main section 233.

A plurality of modified switching devices 222 are mounted to the right side sliding plate 232 at about the intersections of the various branch sections 256, 268, 259, 260, 262, and 263 of the respective position indexing tracks 252 and 254. The modified switching devices 222 direct the right side pins 48 and 50 to the appropriate branch sections in the respective position indexing tracks 252 and 254 in the manner that will be described in greater detail below.

As was the case for the earlier embodiments, the left and right side sliding plates 228 and 232 may be fabricated from any of a wide range of materials, such as metals or plastics, suitable for the intended application. In one preferred embodiment, the sliding plates 228 and 232 are molded from a thermoplastic material, such as polycarbonate with 5% Teflon® by weight, although other moldable plastic materials may also be used. If the sliding plates 228 and 232 are molded from a plastic material, then the various bridge members 213 may comprise an integral part of the sliding plates 228 and 232. Alternatively, the bridge members 213 may comprise separate components that may then be fixedly attached to the sliding plates 228 and 232 by any convenient fastening system or device (e.g., such as by adhesives, by welding, or by mechanical fasteners, such as screws, etc). It is also preferred, but not required, that the position indexing tracks 238, 252, and 254 be coated with a low friction material (e.g., Teflon®) to provide low friction bearing surfaces for the left and right side pins 36 and 48, 50.

Figure 12:
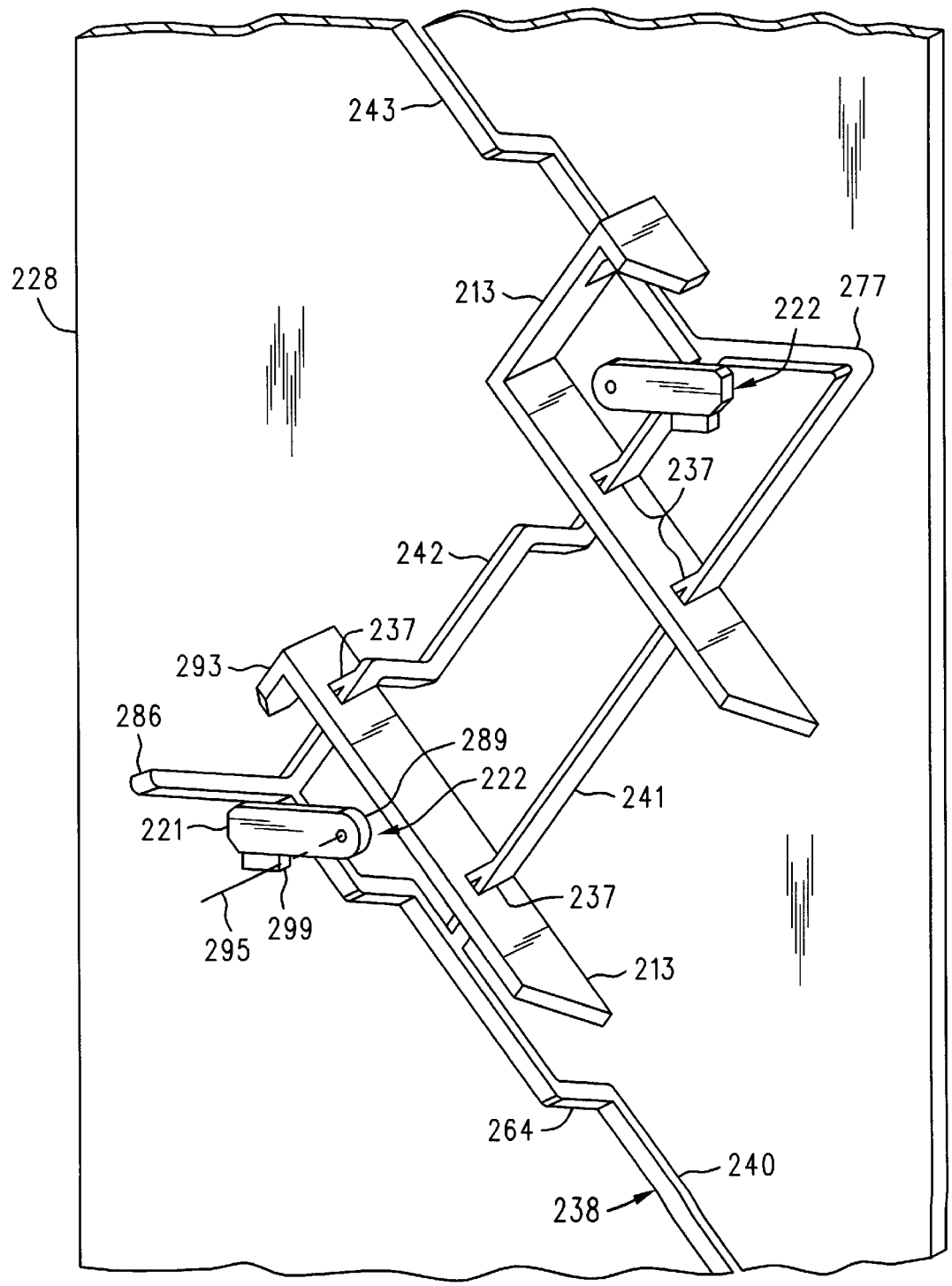
FIG. 12 is a perspective view of a modified switching device on the left side sliding plate shown in FIG. 10.
Figure 13A:
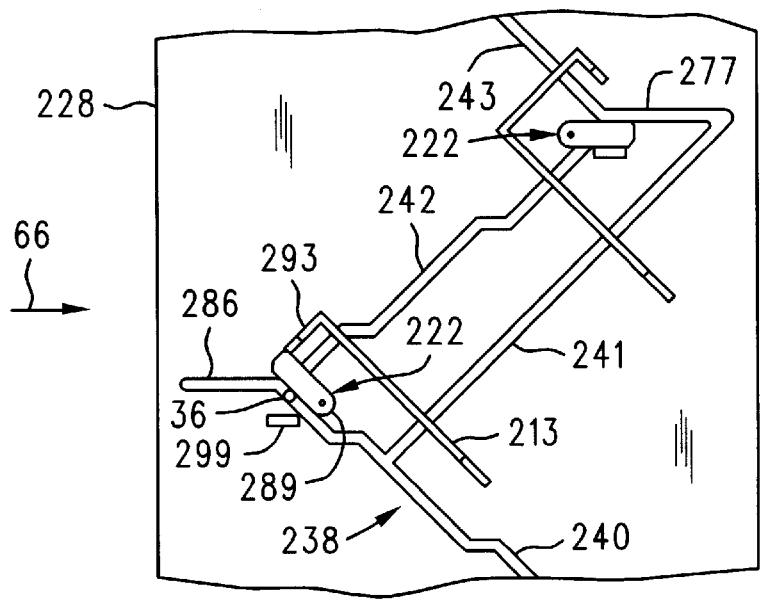
FIGS. 13(a–f) are elevation views showing how the modified switching device directs the pin between the ascending branches and the descending branch of the sliding plate.
Figure 13B:
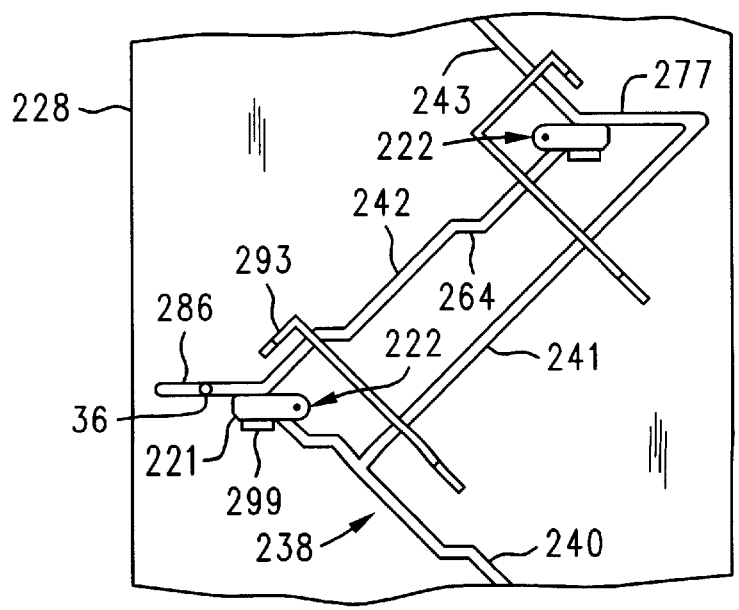
Figure 13C:
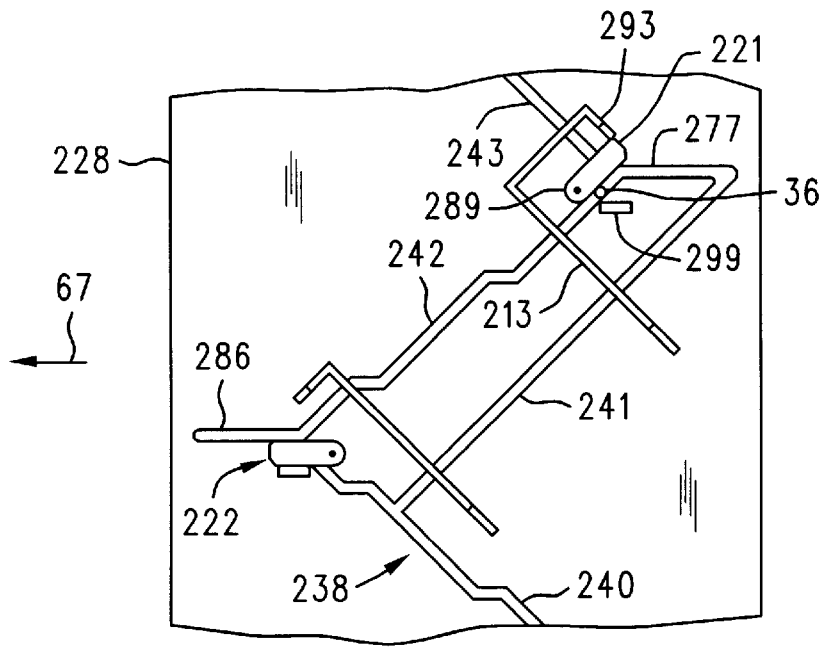

The modified switching device 222 utilized in the third embodiment 220 of the pin-in-track position indexing system differs from the switching device 22 shown and described above for the other embodiments in that the modified switching device 222 dispenses with the need for the switch member 91 (FIG. 6). Referring primarily now to FIG. 12, the modified switching device 222 may comprise a gate member 289 having an elongate gate section 221, a first stop member 293 and a second stop member 299. The gate member 289 of modified switching device 222 may be pivotally mounted to the sliding plate (e.g., left side sliding plate 288) so that it is free to pivot about axis 295 from a first position (illustrated in FIG. 12) to a second position (illustrated in FIG. 13(a)). The first and second stop members 293 and 299 may be fixedly mounted to the sliding plate (e.g., sliding plate 228) in the positions shown. In one preferred embodiment, the first stop member 293 may comprise a portion of the bridge member 213. Gate member 289 may be biased toward the first position by any of a wide range of suitable devices, such as a spring (not shown), well known in the art for biasing rotating members to a desired position. Alternatively, the action of gravity may be used to bias the gate member 289 toward the first position.

The gate member 289 and first and second stop members 293 and 299 may be made from any of a wide range of materials (e.g., metals or plastics) suitable for the intended application. In one preferred embodiment, the gate member 289 is made from a polycarbonate plastic material that may have about 5% by weight carbon (graphite) and about 5% by weight Teflon® added as friction modifiers. Alternatively, other materials may also be used. First and second stop members 293 and 299 may be fabricated from any material suitable for the intended application. In one preferred embodiment wherein the left side sliding plate 228 is molded from a plastic material, the first and second stop members 293 and 299 may comprise an integral part of the sliding plate 228, with the former comprising a portion of the bridge member 213, as best seen in FIG. 12.

The various modified switching devices 222 are actuated by the pins (e.g., pins 36 and 48, 50) to direct the pins from the lower branch (e.g, 240) to the next highest branch (e.g., 242). However, unlike the switching device 22 for the first two embodiments 20 and 120 of the pin-in-track position indexing system, the modified switching device 222 does not direct the pin (e.g., 36) from a higher branch (e.g., 242) to a lower branch (e.g., 240). Instead, the separate descending branch section (e.g., 241) is used to guide the pin (e.g., 36) from an upper branch (e.g., 242) to a lower branch (e.g., 240).

Before proceeding with the detailed description of the operation of the modified switching device 222, it should be noted that the following operational description is directed to the left side sliding plate 228. However, the operation of the switching device 222 is identical whether it is located on the left side sliding plate 228 or the right side sliding plate 232. Also, it should be remembered that the various pins (e.g., 36 and 48, 50) move only vertically and not horizontally. That is, the various pins are prevented from moving in the horizontal direction by the respective elongate slots 34 and 44, 46 in the left and right side fixed plates 26 and 30 (FIG. 1). However, in the following description it is sometimes more convenient to describe the pins as moving in the horizontal direction with respect to the sliding plates 228 and 232 even though it is the sliding plates, and not the pins, that move horizontally.

Referring now to FIGS. 13(a–b) the modified switching device 222 may be used to direct the left side pin 36 from the first or lower inclined branch section 240 to the second or intermediate inclined branch section 242 of position indexing track 238. Consider, for example, an initial condition wherein the left side pin 36 is located in the lower branch section 240. In order to move the left side pin 36 to the second or intermediate branch section 242, the actuator system 24 (FIG. 1) moves the left side sliding plate 228 in the direction of arrow 66. As the left side pin 36 ascends the lower branch section 240 (as a result of the left side sliding plate 228 moving with respect to the horizontally stationary left side pin 36), the left side pin 36 eventually contacts the gate section 221 of gate member 289 and begins rotating it toward the second position. Ultimately the pin 36 will cause the gate section 21 to contact the first stop member 293 on bridge 213. See FIG. 13(a). As the left side sliding plate 228 continues to move in the direction of arrow 66, the gate section 221 of gate member 289 directs the left side pin 36 to the lower horizontal intersecting branch section 286. Continued movement of the sliding plate 228 in the direction of arrow 66 causes the horizontal branch section 286 to continue to move with respect to the left side pin 36 until the pin 36 clears the gate section 221 of gate member 289. Gate member 289 then returns to the first position, as best seen in FIG. 13(b).

Once the gate member 289 has returned to the first position, the modified switching device 222 is in a state to direct the left side pin 36 to the intermediate inclined branch section 242. This may occur as soon as the actuator system 24 reverses the direction of the left side sliding plate 228, i.e., when the actuator system 24 stops the sliding plate 228 from moving in the direction of arrow 66 and begins moving the plate 228 in the direction of arrow 67. As the sliding plate 228 moves in the direction of arrow 67, the gate section 221 of gate member 289 prevents the pin 36 from entering the lower branch section 240 and instead directs the pin 36 to the intermediate branch section 242. Thereafter, the actuator system 24 may stop the motion of the sliding plate 228 when the pin 36 has reached the desired dwell section 264 of the intermediate branch section 242 that corresponds to the desired vertical position 288.

Figure 13D:
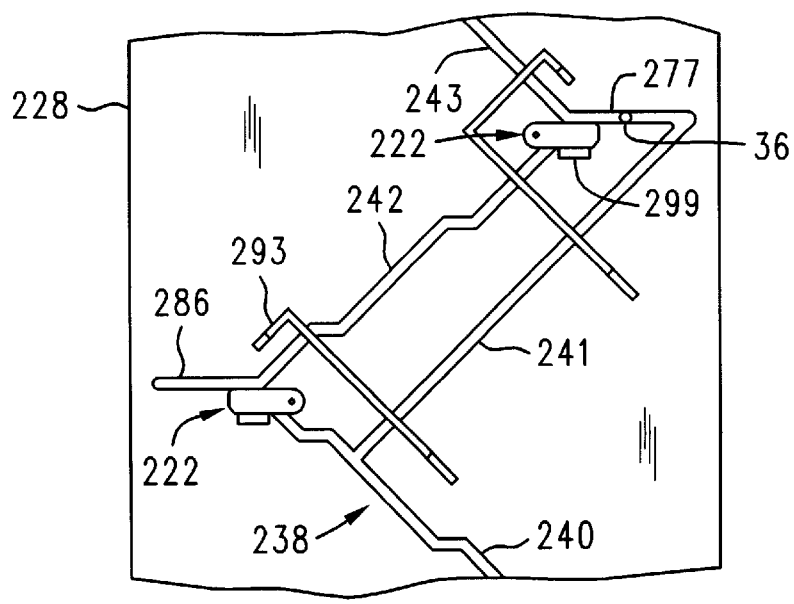

If it is desired to continue elevating the pin 36 to the upper branch section 243, the actuator system 24 will continue to move the left side sliding plate 228 in the direction of arrow 67. This motion causes the pin 36 to continue to ascend the intermediate inclined branch section 242 until pin 36 contacts the gate section 221 of the upper modified switching device 222. Once contact is made, the pin 36 begins rotating the gate member 289 of the upper modified switching device 222 toward the second position, ultimately causing the gate section 221 of gate member 289 to contact the first stop member 293. See FIG. 13(c). Continued movement of the sliding plate 228 in the direction of arrow 67 causes the gate section 221 of gate member 289 to direct the left side pin 36 to the upper horizontal intersecting branch section 277. The left side pin 36 enters the branch section 277 and eventually clears the gate section 221 of gate member 289 which allows the gate member 289 to return to the first position. This condition is illustrated in FIG. 13(d).

Figure 13E:
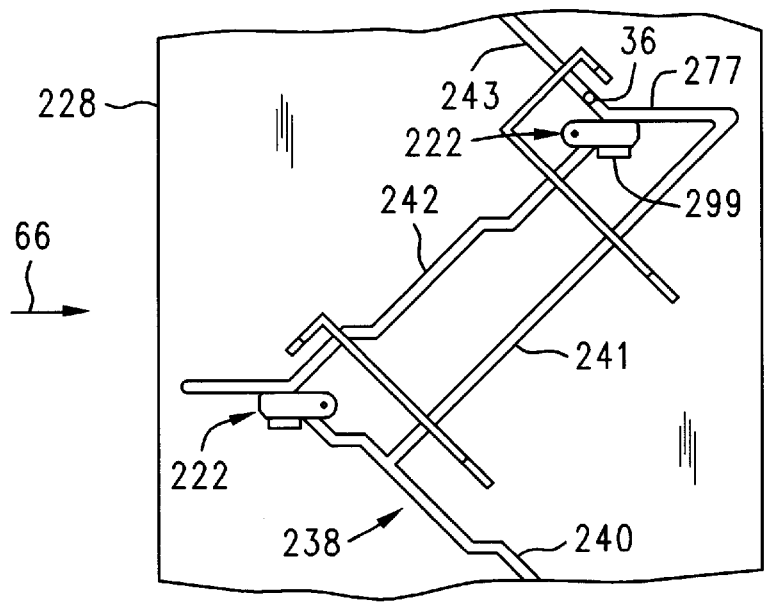
Figure 13F:
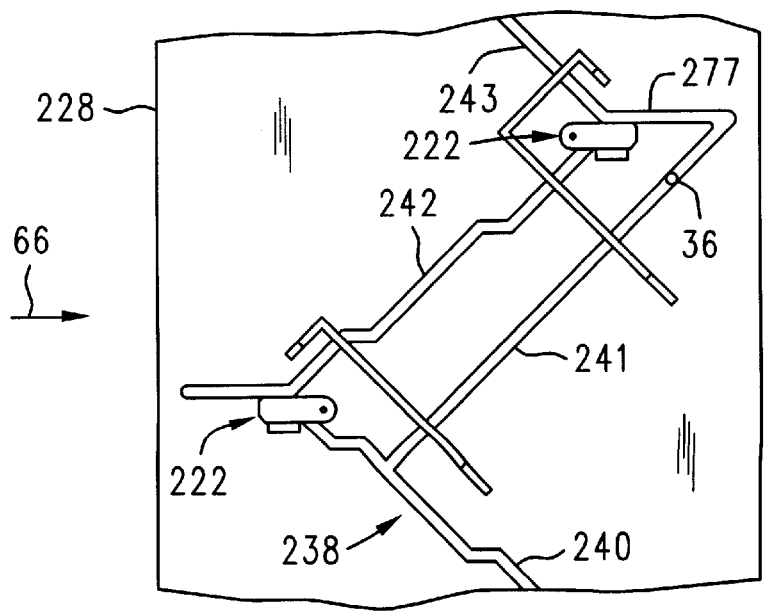

Once the gate member 289 of the upper modified switching device 222 has returned to the first position, the modified switching device 222 is in a state to direct the pin 36 to the upper branch section 243. This may be accomplished when the actuator system 24 reverses the direction of the left side sliding plate 228, i.e., when the actuator system 24 stops the sliding plate 228 from moving in the direction of arrow 67 and begins moving the plate 228 in the reverse direction (i.e., in the direction of arrow 66). As the sliding plate 228 moves in the direction of arrow 66, the gate section 221 of gate member 289 prevents the pin 36 from entering the intermediate branch section 242 and instead directs the pin 36 to the upper branch section 243. This condition is illustrated in FIG. 13(e). Thereafter, the actuator system 24 may stop the motion of the sliding plate 228 when the pin 36 has reached the desired dwell section 264 of the upper branch section 243. See also FIG. 10.

Consider now a situation wherein it is desired to direct the pin 36 from the upper branch section 243 to the lower branch section 240. Assuming that the actuator system 24 has positioned the pin 36 so that it is located in the upper horizontal intersecting branch section 277 (i.e., the condition shown in FIG. 13(d)), the pin 36 may be directed to enter the descending branch section 241 by moving the plate 228 in the direction of arrow 67. As soon as the pin 36 reaches the descending branch section 241, gravity causes the pin 36 to enter the descending branch section 241. The actuator system 24 then reverses direction and begins to move the left side sliding plate 228 in the direction of arrow 66. Movement of the left side sliding plate 228 in the direction of arrow 66 causes the pin 36 to descend the descending branch section 241, as shown in FIG. 13 (f). When the pin 36 reaches the lower inclined branch section 240, the actuator system 24 may again reverse the direction of the sliding plate 228, which causes the pin 36 to descend the lower inclined branch section 240. Thereafter, the actuator system 24 may stop the motion of the left side sliding plate 228 when the pin 36 has reached the dwell section 264 of the lower branch section 240 that corresponds to the desired vertical position 288 (FIG. 10). The descending branch section 241 therefore provides a way for the pin 36 to be lowered from the upper branch section 243 to the lower branch section 240 without the need to use a switching device 22 of the type shown in FIG. 6 to accomplish the transfer.

Figure 14:
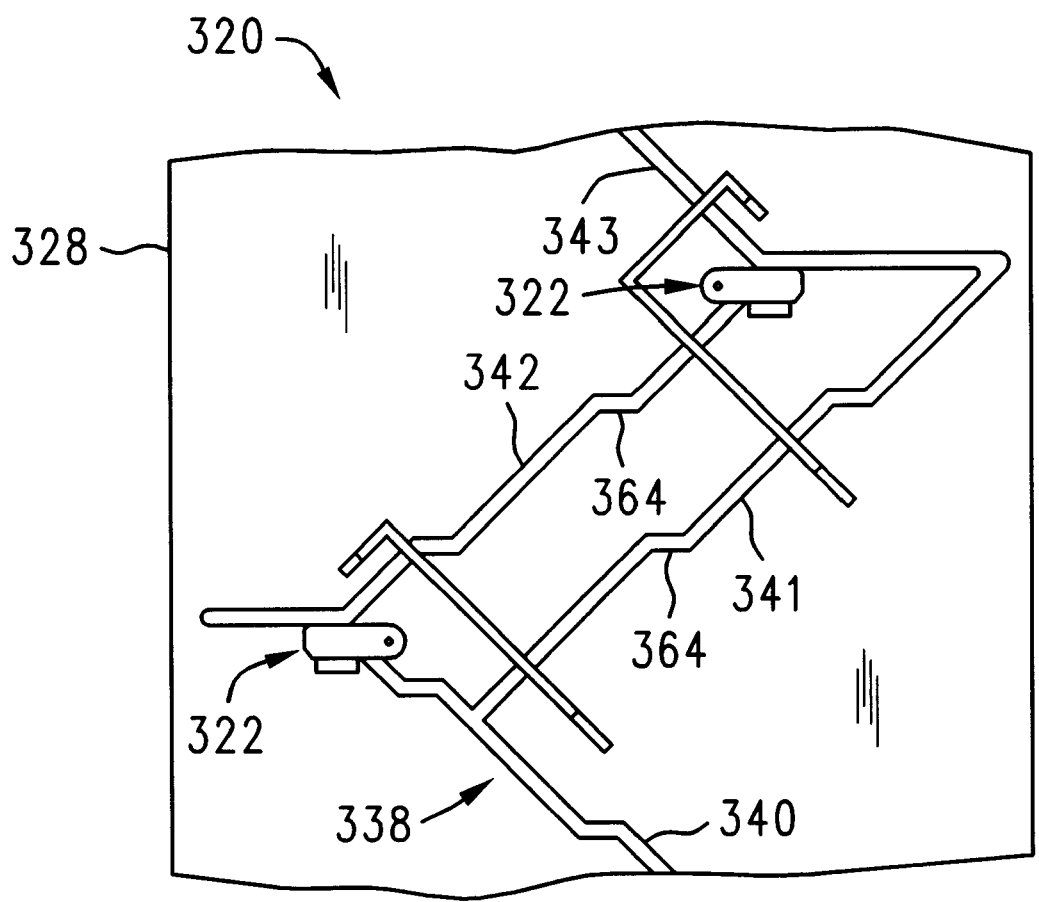
FIG. 14 is an elevation view of the left side of a fourth embodiment of a left side sliding plate having a separate descending branch with dwell sections.

While the descending branch section 241 shown and described above comprises a continuous incline with no horizontal dwell sections, a fourth embodiment 320 of a pin-in-track lift system may be provided with a descending branch section 341 having at least one dwell section 364. Referring now to FIG. 14, the fourth embodiment 320 of a pin-in-track lift system may comprise a left side sliding plate 328 having a position indexing track 338 with three inclined branch sections 340, 342, and 343. A pair of modified switching devices 322 may be positioned at about the intersections of the inclined branch sections 340, 342, and 343 to direct the left side pin 36 to the appropriate branch section in the manner just described for the third embodiment 220 of the pin-in-track position indexing system. The modified switching devices 322 may be identical to the modified switching devices 222 just described.

The position indexing track 338 includes a descending branch section 341 having a plurality of horizontal dwell sections 364 that correspond to the horizontal dwell sections 364 located on the intermediate inclined branch section 342. The horizontal dwell sections 364 on the descending branch section 341 allow the actuator system 24 to position the pin 36, thus media access device 16, at storage locations that correspond to the dwell sections 364 located on the by-passed intermediate branch section 342.

It is contemplated that the inventive concepts herein described may be variously otherwise embodied and it is intended that the appended claims be construed to include alternative embodiments of the invention except insofar as limited by the prior art.

What is claimed is:

1. A lift system for raising and lowering a carriage, comprising:

a pin-in-track position indexing apparatus associated with the carriage, said pin-in-track position indexing apparatus including at least one position indexing track having first and second inclined branches and at least one guide pin for engaging the position indexing track;

switching apparatus comprising at least one pivotable member associated with said pin-in-track position indexing apparatus for allowing the at least one guide pin to move between the first and second inclined branches of the position indexing track; and an actuator operatively associated with said pin-in-track position indexing apparatus for actuating said pin-in-track position indexing apparatus to raise and lower the carriage.

2. The lift system of claim 1, wherein said pin-in-track position indexing apparatus comprises:

a fixed plate having an elongate slot therein extending in a direction of travel of the carriage; and a sliding plate having the position indexing track therein, wherein the at least one guide pin is attached to the carriage so that the at least one guide pin engages both the elongate slot in said fixed plate and the position indexing track in said sliding plate.

3. The lift system of claim 2, wherein said fixed plate is positioned between said sliding plate and the carriage.

4. The lift system of claim 2, wherein said sliding plate is positioned between said fixed plate and the carriage.

5. The lift system of claim 2, wherein said actuator comprises a linear translation apparatus for moving said sliding plate relative to said fixed plate in a direction generally transverse to the direction of travel.

6. The lift system of claim 5, wherein said switching apparatus comprises:
- a gate member mounted to said sliding plate and moveable between a first position and a second position; and
- a switch member mounted to said sliding plate for moving said gate member from the first position to the second position.

7. The lift system of claim 6, wherein said switch member is actuated by the at least one guide pin.

8. The lift system of claim 7, wherein said gate member is pivotally mounted to said sliding plate at about an intersection between the first inclined branch and the second inclined branch of the position indexing track and wherein said switch member is pivotally mounted to said sliding plate at a position adjacent said gate member.

9. The lift system of claim 8, wherein said gate member includes an elongate gate section that is transverse the first inclined branch of the position indexing track when said gate member is in the first position and that is transverse the second inclined branch of the position indexing track when said gate member is in the second position.

10. The lift system of claim 9, wherein said switch member includes an elongate paddle section for engaging the elongate gate section of said gate member to move said gate member from the first position to the second position.

11. A lift system, comprising:
- a carriage;
- a pin-in-track position indexing apparatus associated with said carriage, said pin-in-track position indexing apparatus including at least one position indexing track having first and second inclined branches and at least one guide pin for engaging the position indexing track, the at least one guide pin being mounted to said carriage;
- switching apparatus comprising at least one pivotable member associated with said pin-in-track position indexing apparatus for allowing the guide pin to move between the first and second inclined branches of the position indexing track; and
- an actuator operatively associated with said pin-in-track position indexing apparatus for actuating said pin-in-track position indexing apparatus to raise and lower said carriage.

12. The lift system of claim 11, wherein said pin-in-track position indexing apparatus comprises:
- a fixed plate having an elongate slot therein extending in a direction of travel of the carriage; and
- a sliding plate having the position indexing track therein, wherein the at least one guide pin is attached to the carriage so that the guide pin engages both the elongate slot in said fixed plate and the position indexing track in said sliding plate.

13. The lift system of claim 12, wherein said actuator comprises a linear translation apparatus for moving said sliding plate relative to said fixed plate in a direction generally transverse to the direction of travel.

14. The lift system of claim 13, wherein said switching apparatus comprises:
- a gate member mounted to said sliding plate and moveable between a first position and a second position; and
- a switch member mounted to said sliding plate for moving said gate member from the first position to the second position.

15. The lift system of claim 14, wherein said switch member is actuated by the at least one guide pin.

16. The lift system of claim 15, wherein said gate member is pivotally mounted to said sliding plate at about an intersection between the first inclined branch and the second inclined branch of the position indexing track and wherein said switch member is pivotally mounted to said sliding plate at a position adjacent said gate member.

17. The lift system of claim 16, wherein said gate member includes an elongate gate section that is transverse the first inclined branch of the position indexing track when said gate member is in the first position and that is transverse the second inclined branch of the position indexing track when said gate member is in the second position.

18. The lift system of claim 17, wherein said switch member includes an elongate paddle section for engaging the elongate gate section of said gate member to move said gate member from the first position to the second position.

19. A lift system for raising and lowering an object, comprising:
- a carriage for supporting the object to be raised and lowered, said carriage having a first side and a second side;
- a first guide pin attached to the first side of said carriage and extending generally outwardly therefrom;
- a second guide pin attached to the second side of said carriage and extending generally outwardly therefrom;
- a third guide pin attached to the second side of said carriage and extending generally outwardly therefrom, said third guide pin being located a spaced distance from said second guide pin;
- a first fixed plate having a first elongate slot therein, said first fixed plate being positioned adjacent the first side of said carriage so that said first pin engages the first elongate slot;
- a second fixed plate having second and third elongate slots therein, said second fixed plate being positioned adjacent the second side of said carriage so that said second and third pins engage the respective second and third elongate slots;
- a first sliding plate having a first position indexing slot therein, the first position indexing slot having a first inclined branch and a second inclined branch, said first sliding plate being positioned adjacent said first fixed plate so that the first and second inclined branches of the first position indexing slot are generally oblique to the first elongate slot in said first fixed plate and so that said first pin engages said first position indexing slot;
- a first switching apparatus comprising at least one pivotable member associated with said first sliding plate for guiding said first pin from the first inclined branch to the second inclined branch and vice versa;
- a second sliding plate having second and third position indexing slots therein, the second and third position indexing slots having respective first and second inclined branches, said second sliding plate being positioned adjacent said second fixed plate so that the first and second inclined branches of the second and third position indexing slots are generally oblique to the second and third elongate slots in said second fixed plate and so that said second and third pins engage the second and third position indexing slots, respectively;
- a second switching apparatus comprising at least one pivotable member associated with said second sliding plate for guiding said second pin from the first inclined branch to the second inclined branch of said second position indexing slot and vice versa;

a third switching apparatus comprising at least one pivotable member associated with said second sliding plate for guiding said third pin from the first inclined branch to the second inclined branch of said third position indexing slot and vice versa; and an actuator operatively associated with said first and second sliding plates for translating said first and second sliding plates in a direction generally perpendicular to the first elongate slot in said first fixed plate, the translations of said first and second sliding plates causing said first, second, and third pins to move along said first, second, and third position indexing slots to raise and lower said carriage.

20. A lift system for raising and lowering a carriage, comprising:

a pin-in-track position indexing apparatus associated with the carriage, said pin-in-track position indexing apparatus including at least one position indexing track having a first inclined branch section, a second inclined branch section, and a descending branch section and at least one pin operatively associated with the carriage for engaging the position indexing track;

switching apparatus comprising at least one pivotable member associated with the position indexing track of said pin-in-track position indexing apparatus for allowing the at least one pin to move between the first and second inclined branches of the position indexing track and to descend the descending branch section of the position indexing track; and an actuator operatively associated with said pin-in-track position indexing apparatus for actuating said pin-in-track position indexing apparatus to raise and lower the cartridge.

21. The lift system of claim 20, wherein said pin-in-track position indexing apparatus comprises:

a fixed plate having an elongate slot therein extending in a direction of travel of the carriage; and a sliding plate having the position indexing track therein, wherein the at least one pin is attached to the carriage so that the guide pin engages both the elongate slot in said fixed plate and the position indexing track in said sliding plate.

22. The lift system of claim 21, wherein said fixed plate is positioned between said sliding plate and the carriage.

23. The lift system of claim 21, wherein said sliding plate is positioned between said fixed plate and the carriage.

24. The lift system of claim 21, wherein said actuator comprises linear translation apparatus for moving said sliding plate relative to said fixed plate in a direction generally transverse to the direction of travel.

25. The lift system of claim 24, wherein said switching apparatus comprises a gate member mounted to said sliding plate and moveable between a first position and a second position.

26. The lift system of claim 25, wherein said gate member is pivotally mounted to said sliding plate at about an intersection between the first inclined branch and the second inclined branch of the position indexing track.

27. The lift system of claim 26, wherein said gate member includes an elongate gate section that is located at a position substantially transverse the first inclined branch section of the position indexing track when said gate member is in the first position and that is located at a position substantially transverse the second inclined branch section of the position indexing track when said gate member is in the second position.

28. A lift system for raising and lowering a carriage, comprising:

a fixed plate mounted adjacent the carriage, said fixed plate having an elongate slot therein that extends in a direction of travel of the carriage;

a sliding plate having a position indexing track therein, the sliding plate being positioned adjacent said fixed plate, the position indexing track comprising a first inclined branch and a second inclined branch;

a pin mounted to the carriage, said pin adapted to be slidably received by the elongate slot in said fixed plate and by the position indexing track in said sliding plate, said pin being attached to the carriage so that said pin engages both the elongate slot in said fixed plate and the position indexing slot in said sliding plate;

switching apparatus mounted to said sliding plate at a position adjacent the position indexing track for allowing the pin to move between the first and second inclined branches of the position indexing track; and an actuator connected to said sliding plate for moving said sliding plate in a direction transverse to the direction of travel.

29. The lift system of claim 28, wherein said position indexing track includes a descending branch connecting the upper inclined branch and the lower inclined branch.

30. The lift system of claim 29, wherein said descending branch includes at least one horizontal dwell section.

31. The lift system of claim 30, wherein said switching apparatus comprises a gate member mounted to said sliding plate and moveable between a first position and a second position.

32. The lift system of claim 31, wherein said gate member is pivotally mounted to said sliding plate at about an intersection between the first inclined branch and the second inclined branch of the position indexing track.

33. The lift system of claim 32, wherein said gate member includes an elongate gate section that is located at a position substantially transverse the first inclined branch section of the position indexing track when said gate member is in the first position and that is located at a position substantially transverse the second inclined branch section of the position indexing track when said gate member is in the second position.

\* \* \* \* \*